(12) United States Patent
Green et al.

(10) Patent No.: US 9,201,853 B2
(45) Date of Patent: *Dec. 1, 2015

(54) FRAME-SLOT ARCHITECTURE FOR DATA CONVERSION

(75) Inventors: Edward A. Green, Englewood, CO (US); Kevin L. Markey, Longmont, CO (US); Alec Sharp, Boulder, CO (US)

(73) Assignee: Oracle International Corporation, Redwood City, CA (US)

(*) Notice: Subject to any disclaimer, the term of this patent is extended or adjusted under 35 U.S.C. 154(b) by 813 days.

This patent is subject to a terminal disclaimer.

(21) Appl. No.: 13/482,914

(22) Filed: May 29, 2012

(65) Prior Publication Data

US 2013/0041908 A1 Feb. 14, 2013

Related U.S. Application Data

(63) Continuation of application No. 12/468,713, filed on May 19, 2009, now Pat. No. 8,190,985, which is a continuation of application No. 11/151,596, filed on Jun. 13, 2005, now Pat. No. 7,536,634.

(51) Int. Cl.
G06F 17/00 (2006.01)
G06F 17/22 (2006.01)
G06F 17/27 (2006.01)
G06F 17/21 (2006.01)

(52) U.S. Cl.
CPC ........ G06F 17/2264 (2013.01); G06F 17/2705 (2013.01); G06F 17/211 (2013.01)

(58) Field of Classification Search
CPC .............................. G06F 17/211; G06F 17/21

USPC ......................................................... 715/200
See application file for complete search history.

(56) References Cited

U.S. PATENT DOCUMENTS

| | | | |
|---|---|---|---|
| 6,233,545 B1 * | 5/2001 | Datig | 704/2 |
| 6,715,128 B1 * | 3/2004 | Hirashima | G06F 17/30294 |
| | | | 707/999.202 |
| 7,233,956 B2 * | 6/2007 | Balducci | G06F 17/2247 |
| 7,240,063 B2 * | 7/2007 | Aoyama | G06F 17/30569 |

(Continued)

OTHER PUBLICATIONS

Mrissa et al., A Context Model for Semantic Mediation in Web Services Composition, Springer 2006, pp. 12-25.*

(Continued)

*Primary Examiner* — Cong-Lac Huynh
(74) *Attorney, Agent, or Firm* — Marsh Fischmann & Breyfogle LLP

(57) ABSTRACT

A machine based tool and associated logic and methodology used in converting data from an input form to a target form using context dependent conversion rules. A frame-slot architecture is utilized where a frame represents an intersection between a contextual cue recognized by the machine tool, associated content and related constraint information to specific to that conversion environment. A slot represents an included chunk of information. An exemplary conversion system (400) includes a parser (402) for use in parsing and converting an input stream (403) to provide an output stream (411) in a form for use by a target system (412). The parser (402) uses information from a public schema (406), a private schema (408) and a grammar (410). The public schema (406), private schema (408) and grammar (410) may include conversion rules applicable to less than the whole of a subject matter area including the input stream (403).

28 Claims, 15 Drawing Sheets

(56) References Cited

U.S. PATENT DOCUMENTS

| | | | | |
|---|---|---|---|---|
| 7,536,634 | B2* | 5/2009 | Green et al. | 715/200 |
| 7,613,996 | B2* | 11/2009 | Dallett | G06F 17/227 715/221 |
| 8,972,846 | B2* | 3/2015 | Lessing | G06F 17/21 715/229 |
| 2004/0010755 | A1* | 1/2004 | Hamada | 715/513 |
| 2004/0172484 | A1* | 9/2004 | Hafsteinsson et al. | 709/246 |
| 2005/0144166 | A1* | 6/2005 | Chapus | G06F 17/30569 |
| 2005/0149552 | A1* | 7/2005 | Chan | G06F 17/30292 |
| 2006/0023945 | A1* | 2/2006 | King et al. | 382/173 |
| 2006/0178862 | A1* | 8/2006 | Chan | G06F 17/50 703/11 |
| 2007/0143327 | A1* | 6/2007 | Rivas et al. | 707/101 |
| 2011/0093467 | A1* | 4/2011 | Sharp et al. | 707/741 |
| 2012/0072386 | A1* | 3/2012 | Willems et al. | 706/47 |
| 2014/0067363 | A1* | 3/2014 | Ogren et al. | 704/2 |

OTHER PUBLICATIONS

Cruz et al., Ontology Enrichment and Automatic Population from XML Data, ACM 2008, pp. 1-5.*

Waterson et al., Verifying Ontological Commitment in Knowledge-based Systems, Elsevier 1999, pp. 45-54.*

* cited by examiner

FRAME-SLOT ARCHITECTURE FOR DATA CONVERSION

CROSS-REFERENCE TO RELATED APPLICATION

This application is a continuation of U.S. patent application Ser. No. 12/468,713, entitled, "Frame-Slot Architecture for Data Conversion," filed on May 19, 2009, now U.S. Pat. No. 8,190,985 which is a continuation of U.S. patent application Ser. No. 11/151,596, entitled, "Frame-Slot Architecture for Data Conversion," filed on Jun. 13, 2005, now U.S. Pat. No. 7,536,634, the contents of which is incorporated herein as if set forth in full.

FIELD OF THE INVENTION

The present invention relates generally to machine-based tools for use in converting data from one form to another and, in particular, to a framework for efficiently accessing and applying external information to improve such conversions. In this regard, the invention further relates to applying public or private rules for structuring or understanding data ("schema") to new data so as to reduce start-up efforts and costs associated with configuring such machine-based tools.

BACKGROUND OF THE INVENTION

In a variety of contexts, it is desired to convert data from a first or input form to a second or target form. Such conversions may involve, for example, linguistics, syntax and formats. In this regard, linguistic differences may be due to the use of different languages or, within a single language, due to terminology, proprietary names, abbreviations, idiosyncratic phrasings or structures and other matter that is specific to a location, region, business entity or unit, trade, organization or the like. Also within the purview of linguistic differences for present purposes are different currencies, different units of weights and measures and other systematic differences. Syntax relates to the phrasing, ordering and organization of terms as well as grammatic and other rules relating thereto. Differences in format may relate to data structures or conventions associated with a database or other application and associated tools.

One or more of these differences in form may need to be addressed in connection with a conversion process. Some examples of conversion environments include: importing data from one or more legacy systems into a target system; correlating or interpreting an external input (such as a search query) in relation to one or more defined collections of information; correlating or interpreting an external input in relation to one or more external documents, files or other sources of data; facilitating exchanges of information between systems; and translating words, phrases or documents. In all of these cases, a machine-based tool attempts to address differences in linguistics, syntax and/or formats between the input and target environments. It will be appreciated in this regard that the designations "input" and "target" are largely a matter of convenience and are process specific. That is, for example, in the context of facilitating exchanges of information between systems, which environment is the input environment and which is the target depends on which way a particular conversion is oriented and can therefore change.

One difficulty associated with machine-based conversion tools relates to properly handling context dependent conversions. In such cases, properly converting an item under consideration depends on understanding something about the context in which the item is used. For example, in the context of product descriptions, an attribute value of "one inch" might denote one inch in length, one inch in radius or some other dimension depending on the product under consideration. In the context of translation, the term "walking" functions differently in the phrase "walking shoe" than in "walking to work." Thus, in these examples and many others, understanding something about the context of an item under consideration may facilitate conversion. Although the value of context in disambiguating or otherwise properly converting information is well recognized, limited success has been achieved in applying this notion to machine-based tools.

SUMMARY OF THE INVENTION

The present invention is directed to a machine-based tool and associated logic and methodology for use in converting data from an input form to a target form using context dependent conversion rules. In this manner conversions are improved, as ambiguities can be resolved based on context cues. In particular, existing public or private schema can be utilized to establish conversion rules for new data thereby leveraging existing structure developed by an entity or otherwise developed for or inherent in a given subject matter context. In this manner, structure can be imported a priori to a given conversion environment and need not, in all cases, be developed based on a detailed analysis of the new data. That is, structure can be imparted in a top-down fashion to a data set and is not limited to bottom-up evolution from the data. This facilitates greater automation of the development of a grammar for a conversion environment as pre-existing knowledge is leveraged. Moreover, in accordance with the invention, context dependent conversion rules can be efficiently accessed without the need to access a rigid and complex classification structure defining a larger subject matter context. A rule structure developed in this manner can provide a high degree of reusability across different conversion environments for reduced start-up effort and cost. Moreover, subject matter cues and structure can be based on or adopt existing data structures and metadata elements (e.g., of an existing database or other structured data system) so as to provide further efficiencies and functionality.

It has been recognized that conversion processes can benefit from context dependent conversion rules that allow for, inter alia, appropriate resolution of ambiguities. Just as humans can often readily resolve such ambiguities based on an understanding of a surrounding context, machine-based tools can be adapted to identify contextual cues and to access and apply context dependent rules and conversion processes. Such context cues can be reflected, in accordance with the present invention, by a parse-tree structure, a frame-slot architecture or a combination thereof. The present inventors have recognized that the frame-slot architecture has particular advantages for certain applications, but each approach has significant utility as discussed below.

The parse-tree involves developing a classification structure by which terms under consideration can be mapped to or associated with a particular classification taxonomy. For example, in the context of a database or catalog of business products, a product attribute term may be associated with a parent product classification, which in turn belongs to a grandparent product grouping classification, etc. The associated classification structure may be referred to as a parse tree. By accessing rules appropriate to this classification structure, conversions can be executed with improved accuracy. This represents a substantial improvement in relation to conventional conversion tools.

However, such a classification taxonomy entails certain inefficiencies. First, in order to encompass a subject matter area of significant size or complexity to a useful degree of classification granularity, very deep parses may be required reflecting a complicated parse tree. These deep parses require substantial effort and processing resources to develop and implement. Moreover, the resulting classification structures impose significant rigidity on the associated conversion processes such that it may be difficult to adapt the structures to a new conversion environment or to reuse rules and structures as may be desired. Moreover, such predefined, complex structures have limited ability to leverage context cues that may exist in source structured data or that may otherwise be inferred based on an understanding of the subject matter at issue, thereby failing to realize potential efficiencies.

In accordance with the present invention, a frame-slot architecture is provided for use in converting information. In this regard, a frame represents an intersection between a contextual cue recognized by the machine tool, associated content and related constraint information specific to that conversion environment, whereas a slot represents an included chunk of information. For example, in the context of product descriptions, a chunk of information such as "1 inch roller bearing" may be recognized by the machine tool logic or grammar as an attribute phrase. The term "1 inch" may then be recognized as an attribute value. In the context of describing a "roller bearing," it may be readily understood that "1 inch" represents a radius dimension and not a length, width, height or similar rectilinear designation. Such contextual cues can be inferred from a general, public understanding of the subject matter, i.e., what a roller bearing is. Such understanding is a kind of public schema. Moreover, an associated private schema may define acceptable values or ranges for this attribute. For example, only certain values or a certain values range for the attribute at issue may be "legal"; that is, only those values may be acceptable within rules defined by an interested entity. In many cases, such private schema may be pre-defined and thus available for use in a conversion process prior to any detailed analysis of the data sets at issue. The attribute value can be compared to such constraints to confirm the identification of the attribute phrase or to identify corrupted or nonconforming data.

The frame is thus a specification of context or other disambiguating cues at or close to the whole-record level, less sensitive to syntax and more sensitive to the intersection of attributes and their values. Thus, a frame functions as a container for grammatical information used to convert data, analogous to a software object. The frame-slot architecture thus can resolve ambiguities without deep parses and yields flexible and more readily reusable syntactic rules. Moreover, constraint information is readily available, e.g., for attribute values, thus allowing for more confidence in conversions and better recognition of conversion anomalies.

In accordance with one aspect of the present invention, a method and apparatus ("utility") is provided for converting a semantic element under consideration. The utility involves receiving content associated with a data source and obtaining first information from the content for use in a conversion. The nature of the content depends, for example, on the conversion environment. In this regard, the content may be structured (e.g., in the case of converting data from a database or other structured source) or unstructured (e.g., in the case of a search query or other textual data source). The first information can be any of a variety of data chunks that are recognized by the utility, for example, an attribute phrase or other chunk including context cues in data or metadata form.

The utility uses the first information to obtain second information, from a location external to the content, for use in the conversion, and uses the first and second information in converting the content from a first form to a second form. For example, the second information may include context specific interpretation rules (e.g., "1 inch" means "1 inch in radius"), context specific constraints (e.g., acceptable attribute values must fall between 0.5-6.0 inches) and/or context-specific syntax or format rules (e.g., re-write as "roller bearing—1 inch radius").

In this manner, a frame-slot architecture can be implemented with attendant advantages as noted above. It will be appreciated that such an architecture can be imposed on data in a top-down fashion or developed from data in a bottom-up fashion. That is, frames may be predefined for a particular subject matter such that data chunks can then be slotted to appropriate frames, or frames can evolve from the data and make use of the data's intrinsic or existing structures. In the latter regard, it will be appreciated that existing databases and structured data often have a high degree of embedded contextual cues that the utility of the present invention can leverage to efficiently define frame-slot architecture.

In accordance with another aspect of the present invention, a utility is provided for converting data from a first form to a second form based on an external schema. Specifically, the utility involves establishing a number of schema, each of which includes one or more conversion rules for use in converting data within a corresponding context of a subject matter area. A set of data is identified for conversion from the first form to the second form and a particular context of the set of data is determined. Based on this context, a first schema is accessed and a conversion rule of the first schema is used in a process for converting the set of data from the first form to the second form.

The schemas are established based on external knowledge of a subject matter area independent of analysis of a particular set of data to be converted. In this regard, the schema may include one or more public schema including conversion rules generally applicable to the subject matter area independent of any entity or group of entities associated with the set of data. For example, such public schema may involve an accepted public definition of a semantic object, e.g., a "flat bar" may be defined as a rectilinear object having a length, width, and thickness where the length is greater than the width which, in turn, is greater than the thickness. Alternatively or additionally, the external schema may include one or more private schema, each including conversion rules specific to an entity or group of entities less than the public as a whole. For example, such a private schema may define legal attribute values in relation to a product catalog of a company. The examples of schema noted above involved some relationship between elements included in a single attribute phrase, e.g., an object such as "bar" and an associated attribute such as "flat." It should be appreciated that schema are not limited to such contexts but more broadly encompass public or private rules for structuring or understanding data. Thus, for example, rules may be based on relationships between different objects such as "paint brush," on the one hand, and "bristles," "handle" or "painter" on the other.

The set of data to be converted may include, for example, an attribute phrase (or phrases) including a semantic object, an attribute associated with the object and an attribute value for that attribute. This attribute phrase may be identified by parsing a stream of data. In this regard, the context of the subject matter area may be determined from the semantic object. Thus, the attribute phrase includes information potentially identifying the semantic object, attribute and attribute value. Logic may be executed to interpret this information so as to identify the object, attribute and/or attribute value. In any event, the object, attribute or attribute value may be compared to a set of objects, attributes or attribute values defined by the first schema. Such a comparison may enable conversion of the set of data from the first form to the second form or may identify an anomaly regarding the set of data.

It will be appreciated that the process of establishing the schema may be implemented in a start-up mode for configuration of a machine-based tool. Such a start-up mode may be employed to configure the tool so as to convert data based on contextual cues inferred from an understanding of the subject matter area. In this regard, the schema enables conversion of data which was not specifically addressed during configuration. Thus, the machine tool is not limited to converting data elements or strings of elements for which context cues have been embedded but can infer contextual cues with respect to new data. In this manner, start-up efforts and costs can be substantially reduced.

BRIEF DESCRIPTION OF THE DRAWINGS

For a more complete understanding of the present invention and further advantages thereof, reference is now made to the following detailed description taken in conjunction with the drawings, in which.

DETAILED DESCRIPTION

Figure 1:
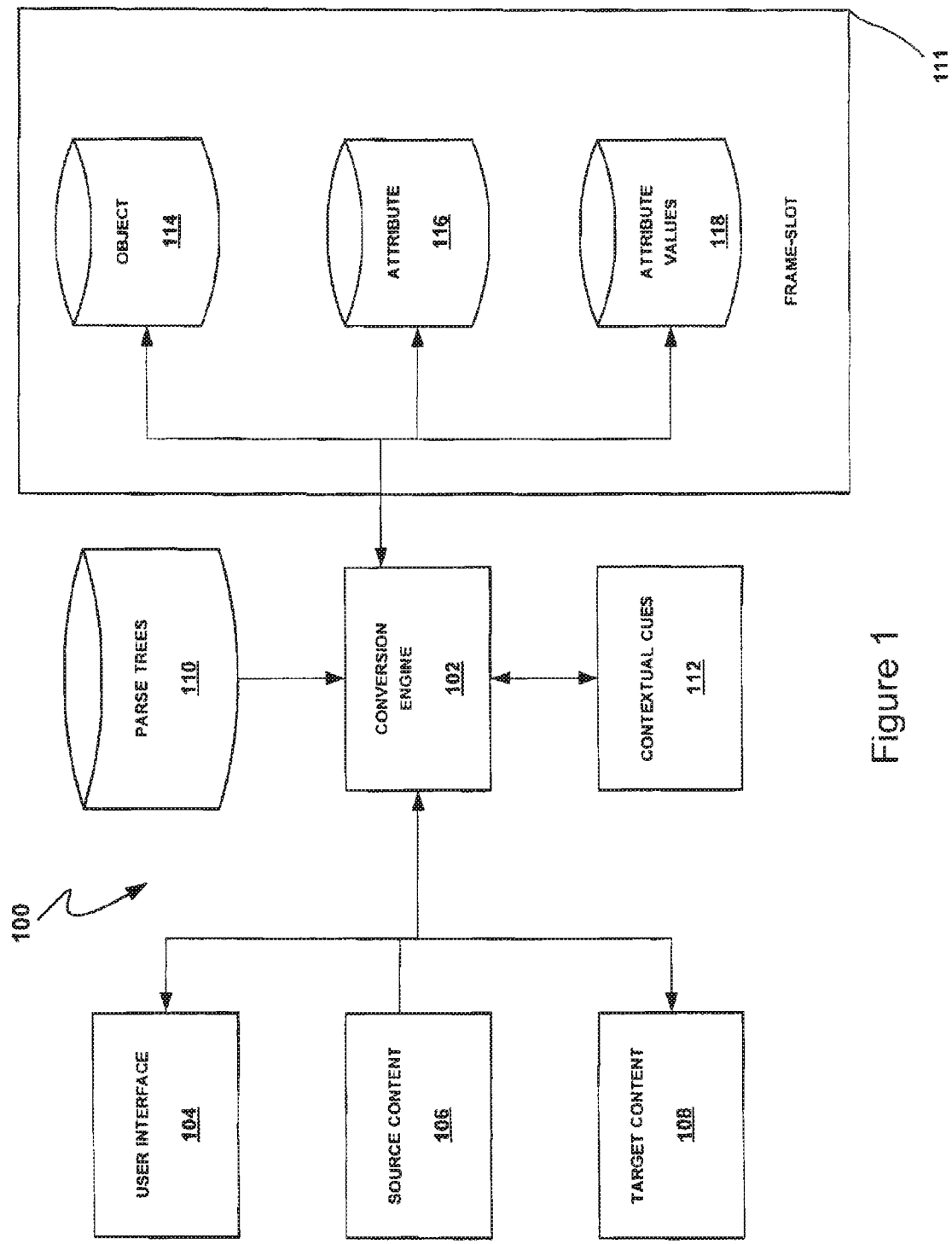
FIG. 1 is a schematic diagram of a semantic conversion system in accordance with the present invention.

The present invention relates to converting data from a first or source form to a second or target form. As noted above, such conversions may be desired in a variety of contexts relating, for example, to importing data into or otherwise populating an information system, processing a search query, exchanging information between information systems and translation. In the following description, the invention is set forth in the context of particular examples relating to processing a source stream including a product oriented attribute phrase. Such streams may include information identifying a product or product type together with a specification of one or more attributes and associated attribute values. For example, the source stream (e.g., a search query or product descriptor from a legacy information system) may include the content "8 oz. ceramic coffee cup." In this case, the product may be defined by the phrase "coffee cup" and the implicit attributes of size and material have attribute values of "8 oz." and "ceramic" respectively.

While such source streams including product oriented attribute phrases provide a useful mechanism for illustrating various aspects of the invention, and in fact represent significant commercial implementations of the invention, it should be appreciated that the invention is not limited to such environments. Indeed, it is believed that the invention is applicable to virtually any other conversion environment with concepts such as product attributes and attribute values replaced, as necessary, by logical constructs appropriate to the subject environment, e.g., part of speech and form. Moreover, as noted above, the conversion rules are not limited to elements of a single attribute phrase or analog, but may involve relationships between objects, including objects set forth in separate phrases. Accordingly, the specific examples below should be understood as exemplifying the invention and not by way of limitation.

In a preferred implementation of the invention, at least some conversions are executed with the assistance of a frame-slot architecture. Such a frame-slot architecture may function independently to define a full conversion model for a given conversion application, or may function in conjunction with one or more parse tree structures to define a conversion model. In the latter regard, the frame-slot architecture and parse tree structures may overlap with respect to subject matter.

The above-noted coffee cup example is illustrative in this regard. It may be desired to correlate the source string "8 oz. ceramic coffee cup" to a product database, electronic catalogue, web-based product information or other product listing. Such a product listing may include a variety of product types, each of which may have associated attributes and grammar rules. In this regard, the product types and attributes may be organized by one or more parse-tree structures. These parse tree structures, which are described and shown in U.S. patent application Ser. No. 10/970,372, generally organize a given subject matter into a hierarchy of classes, subclasses, etc., down to the desired level of granularity, and are useful for improving conversion accuracy and improving efficiency in building a grammar among other things. In this case, "coffee cup" may fall under a parse tree node "cups" which, in turn, falls under a parent node "containers" which falls under "housewares", etc. Similarly, the same or another parse tree may group the term "oz.", or a standardized expression thereof (e.g., defined by a grammar) such as "ounce" under the node "fluid measurements" (ounce may also appear under a heading such as "weights" with appropriate grammar rules for disambiguation) which, in turn, may fall under the parent node "measurements", etc.

As noted above, such a parse tree structure has certain efficiencies in connection with conversion processes. However, in some cases, very deep parses may be required, e.g., in connection with processing terms associated with large data systems. Moreover, such terms are often processed as individual fields of data rather than closer to the whole record level, thereby potentially losing contextual cues that enhance conversion accuracy and missing opportunities to quickly identify content anomalies or implement private schema to define legal attributes or values for a given information object. Finally, such parse tree processes may impose a rigid structure that limits applicability to a specific subject matter context, thereby limiting reuse of grammar segments.

By contrast, a frame-slot architecture allows for consideration of source stream information at, or closer to, the whole record level. This enables substantial unification of ontology and syntax, e.g., collective consideration of attribute phrases, recognized by the grammar and attribute values contained therein. Moreover, this architecture allows for consideration of contextual cues, within or outside of the content to be converted or other external constraints or other external information. In the coffee cup example, the frame-slot architecture allows for consideration of the source stream "8 oz. coffee cup" in its entirety. In this regard, this stream may be recognized as an attribute phrase, having "coffee cup" as an object. Grammar rules specific to this object or a class including this object or rules of a public schema may allow for recognition that "oz." means "ounce" and "ounce" in this context is a fluid measure, not a weight measure. A user-defined schema, for example, a private schema of the source or target information owner, may limit legal quantity values associated with "ounce" in the context of coffee cups to, for example, "6", "8" and "16". In this case, recognition of "8" by the schema provides increased confidence concerning the conversion. If the value had been "12", which would not comply with the schema in this example, this might serve, for example to quickly identify an anomaly (e.g., in the case of mapping records from a legacy data system to a target system) or identify an imperfect match (e.g., in the case of a search query) so that appropriate action may be taken.

The frame-slot architecture thus encompasses a utility for recognizing stream segments, obtaining contextual cues from within or external to the stream, accessing grammar rules specific to the subject matter of the stream segment and converting the stream segment. This may avoid deep parses and allow for greater conversion confidence and accuracy. Moreover, greater grammar flexibility is enabled, thus allowing for a higher degree of potential reuse in other conversion contexts. In addition, executing such processes by reference to a schema enables improved context-related analysis. In short, conversions benefit from surrounding and external context cues in a manner analogous to human processing.

As noted above, the frame-slot architecture may be developed in a top-down or bottom-up fashion. For example, objects, associated attributes and legal attribute values may be defined as schema that are imposed on the data. In the coffee cup example, all of these may be defined based on an analysis of a product inventory or the structure of a legacy information system. In either case, the schema may dictate the legal values for quantity to 6, 8 and 16. Any information not conforming to the schema would then be identified and processed as an anomaly. Conversely, the legal values may be defined based on the data. For example, files from a legacy information system may be used to define the legal attribute values which, then, develop as a function of the input information.

FIG. 1 illustrates a system 100 for implementing such conversion processing. The illustrated system 100 includes a conversion engine 102 that is operative to execute various grammar rules and conversion rules for converting source information to a target form. In the illustrated embodiment, the system 100 is operative to execute both frame-slot architecture methodology and parse tree structure methodology. However, it will be appreciated that a frame-slot architecture may be executed in accordance with the present invention in the absence of a cooperating parse tree environment.

The illustrated grammar engine receives inputs and/or provides outputs via a workstation associated with the user interface 104. For example, in a set-up mode, a user may select terms for processing and create associated relationships and grammar rules via the user interface 104. In the context of a search system, a search query may be entered, and search results may be received, via the user interface 104. In this regard, the grammar engine 102 may be resident at the work station associated with the user interface 104, or may communicate with such a work station via a local or wide area network.

The source content 106 includes the source string to be converted. Depending on the specific application, this content 106 may come from any of a variety of sources. Thus, in the case of an application involving transferring information from one or more legacy information systems into a target information system, the source content 106 may be accessed from the legacy systems. In the case of a search engine application, the source content may be derived from a query. In other cases, the source content 106 may be obtained from a text to be translated or otherwise converted. The source content 106 may be preprocessed to facilitate conversion or may be in raw form. In the case of preprocessing, the raw content may be supplemented, for example, with markers to indicate phrase boundaries, tags to indicate context information, or other matter. Such matter may be provided in a set-up mode process. In addition, some such information may be present in a legacy system and may be used by the conversion engine 102. It will be appreciated that the sources of the content 106 and the nature thereof is substantially unlimited.

The illustrated conversion engine 102 performs a number of functions. In this regard, the engine 102 is operative to process the source content 106 to parse the content into potential objects and attributes, identify the associated attribute values, and, in some cases, recognize contextual cues and other matter additional to the content to be transformed that may be present in the source content. The engine 102 then operates to convert the relevant portion of the source content 106 using a parse tree structure 110 and/or a frame-slot architecture 111, and provides a converted output, e.g., to a user or target system.

With regard to the parse tree structure 100, such a structure is generally developed using the conversion engine 102 in a set-up mode. The nodes of the parse tree structure 110 may be defined by someone familiar with the subject matter under consideration or based on an analysis of a data set. Moreover, certain structure developed in connection with prior conversion applications may be imported to facilitate the set-up process. Such a set-up process is described in U.S. patent application Ser. No. 10/970,372, which is incorporated herein by reference. At a high level, this set-up involves defining the hierarchical structure of the tree, populating the various nodes of the tree, developing standardized terminology and syntax and associated grammar and conversion rules associated with the tree and mapping source content variants to the standardized terminology and syntax.

In the case of the frame-slot architecture 111, the conversion engine 102 obtains the source content 102 and identifies potential objects, attributes and attribute values therein. In this regard, the source content 106 may be parsed as discussed above. In addition, the engine 102 may obtain contextual cues 112 to assist in the conversion. As noted above, such cues may be internal or external to the source content 106. External cues may be based on the identity or structure of a source information system, defined by a schema specific to the frame-slot conversion, or based on information regarding the subject matter under consideration obtained from any external source. For example, information indicating that, when used in connection with "coffee cup" the term "ounce" is a fluid (not a weight) measure, may be encoded into metadata of a legacy information system, defined by a private schema developed for the subject conversion application or derived from an analysis of external information sources.

In the context of the frame-slot architecture, the conversion engine is operative to: identify potential objects, attributes and attribute values; process such information in relation to certain stored information concerning the objects, attributes and attribute values; access associated grammar and conversion rules; and convert the information from the source form to a target form. In this regard, the illustrated system 100 includes stored object information 114, stored attribute information 116 and stored attribute value information 118. This information may be defined by a public or private schema or by reference to external information regarding the subject matter under consideration. For example, the object information 114 may include a list of recognized objects for which the frame-slot architecture is applicable together with information associating the object with legal attributes and/or attribute values and other conversion rules associated with that object. The attribute information 116 may include a definition of legal attributes for the object together with information regarding associated attribute values and associated grammar and conversion rules. Finally, the attribute value information 118 may include a definition of legal attribute values for given attributes together with associated information concerning grammar and conversion rules.

Figure 2:
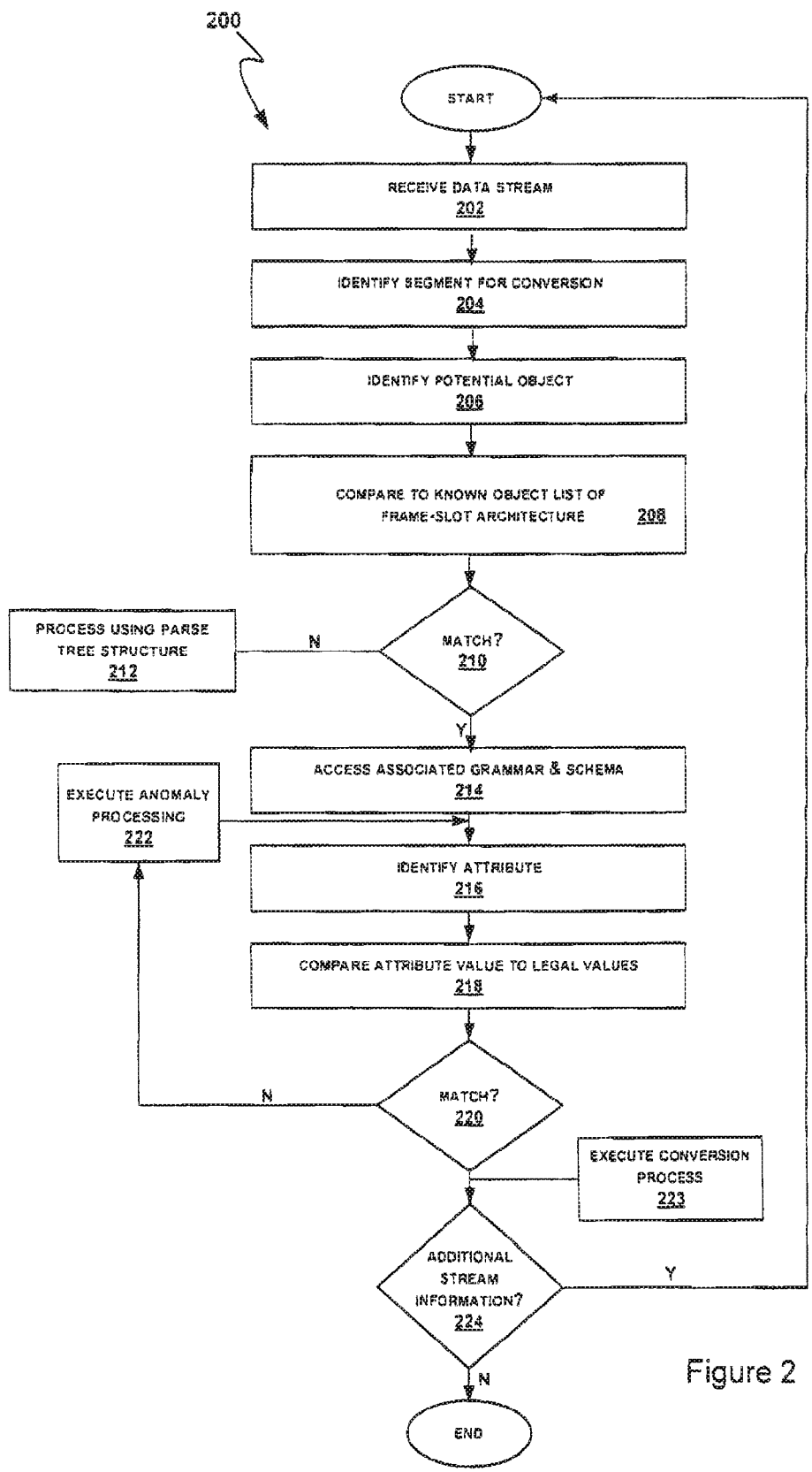
FIG. 2 is a flow chart illustrating a semantic conversion process in accordance with the present invention.

FIG. 2 shows a flow chart illustrating a process 200 that may be implemented by a conversion system such as described above. It will be appreciated that the various process steps illustrated in FIG. 2 may be combined or modified as to sequence or otherwise. Moreover, the illustrated process 200 relates to a system that executes a parse tree structure as well as a frame-slot architecture. It will be appreciated that a frame-slot architecture in accordance with the present invention may be implemented independent of any associated parse tree structure.

The illustrated process 200 is initiated by receiving (202) a data stream from a data source. Such a data stream may be entered by a user or accessed from a legacy or other information system. A segment of the data stream is then identified (204) for conversion. For example, the segment may comprise an attribute phrase or any other chunk of source data that may be usefully processed in a collective form. Such a segment may be identified as the entirety of an input such as a search query, the entirety or a portion of a file from a legacy or other information system, or based on a prior processing step whereby phrase boundaries have been marked for purposes of conversion processing or based on logic for recognizing attribute phrases or other chunks to be coprocessed.

In the illustrated process 200 the identified segment is then processed to identify (206) a potential object within the segment. In the case of the coffee cup example above, the object may be identified as the term "cup" or "coffee cup." The potential object may be identified by comparison of individual terms to a collection of recognized objects or based on a preprocessing step wherein metadata has been associated with the source content to identify components thereof including objects. The potential object is then compared (208) to a known object list of a frame-slot architecture. As discussed above, within a given subject matter, there may be a defined subset for which frame-slot processing is possible. In the illustrated process 200, if a match (210) is identified, the system then accesses (214) an associated grammar and schema for processing in accordance with the frame-slot architecture. Otherwise, the segment is processed (212) using a parse tree structure. As a further alternative, if no object is recognized, an error message may be generated or the segment may be highlighted for set-up processing for out of vocabulary terms, e.g., so as to expand the vocabulary and associated grammar rules.

In the case of processing using the frame-slot architecture, an attribute associated with the object is then identified (216). In the coffee cup example, the terms "ceramic" or "8 oz." may be identified as reflecting attributes. Such identification may be accomplished based on grammar rules or based on metadata associated with such terms by which such terms are associated with particular attribute fields. The associated attribute values are then compared (218) to legal values. For example, the value of "8 oz." may be compared to a listing of legal values for the attribute "fluid measurement" in the context of "coffee cup." These legal values may be defined by a private schema, for example, limited to the inventory of an entity's product catalog or may be based on other external information (e.g., defining a legal word form based on part of speech). If a match is found (220) then the attribute phrase is recognized and an appropriate conversion process if executed (223) in accordance with the associated grammar and conversion rules. The process 200 then determines whether additional stream information (224) is available for processing and either processes such additional information or terminates execution.

In the case where the attribute value does not match a legal value, anomaly processing is executed (222). How anomalies are processed generally depends on the application and context. For example, if an anomaly is identified during a set-up process, the anomalous attribute value may be verified and added to the legal values listing. For example, in the coffee cup example, if the attribute value is "12 oz." and that value does not match a previously defined legal value but, in fact, represents a valid inventory entry, the term "12 oz." (or a standardized version thereof) may be added to the legal values list for the attribute "fluid measurement" in the context of "coffee cup."

Alternatively, further processing may indicate that the attribute value is incorrect. For example, if the attribute value was "6 pack," an error in parsing may be indicated. In this case, an appropriate error message may be generated or the segment may be reprocessed to associate an alternate attribute type, e.g., "object quantity," with the term under consideration.

In other contexts, different anomaly processing may be executed. For example, in the case of processing a search query, illegal values may be ignored or closest match algorithms may be executed. Thus, in the case of a query directed to a "12 oz. coffee cup," search results may be generated or a link may be executed relative to inventory related to coffee cups in general or to 8 and 16 oz. coffee cups. It will be appreciated that many other types of anomaly processing are possible in accordance with the present invention.

Figure 4:
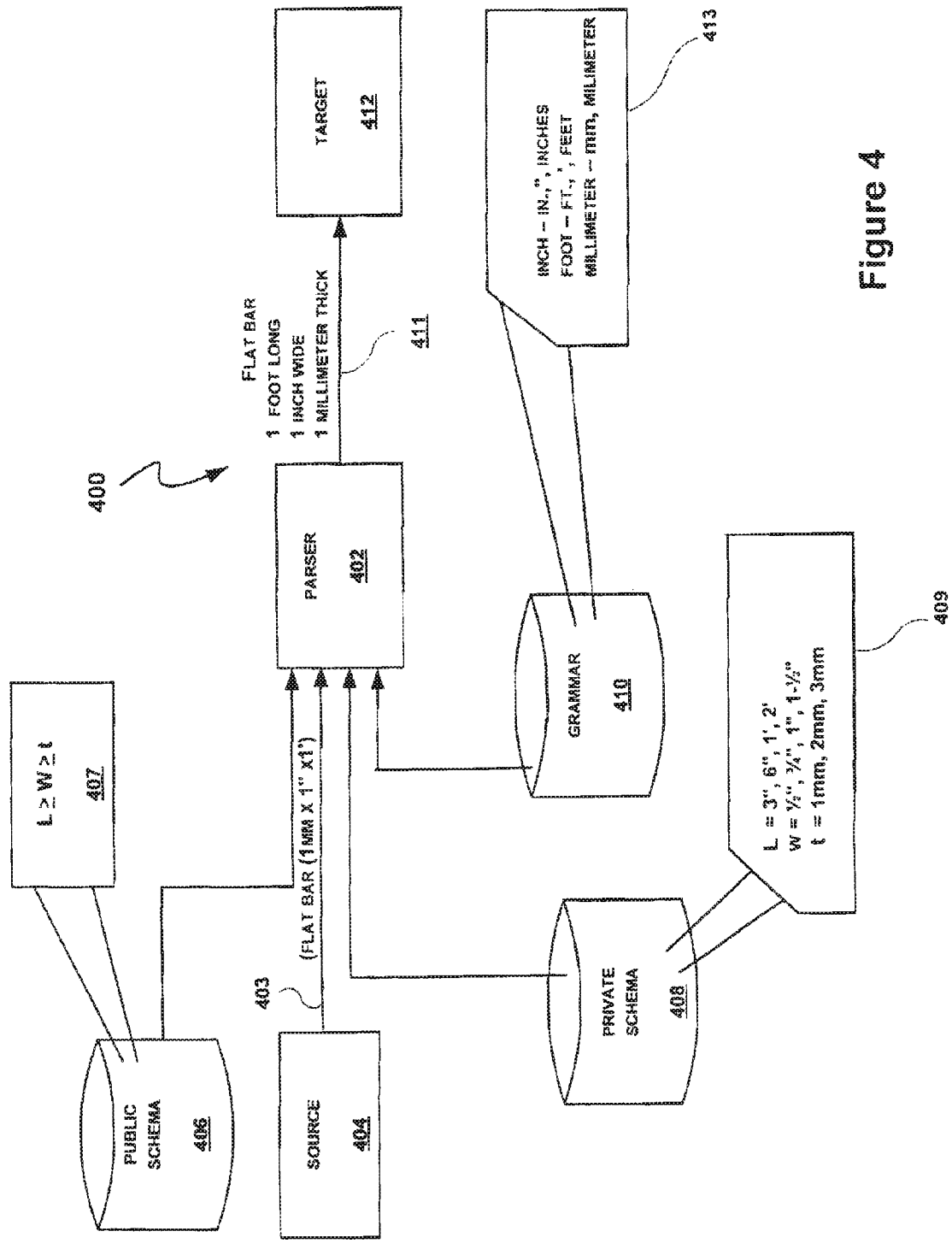
FIG. 4 is a schematic diagram illustrating the use of public and private schema in a conversion process in accordance with the present invention.
Figure 5:
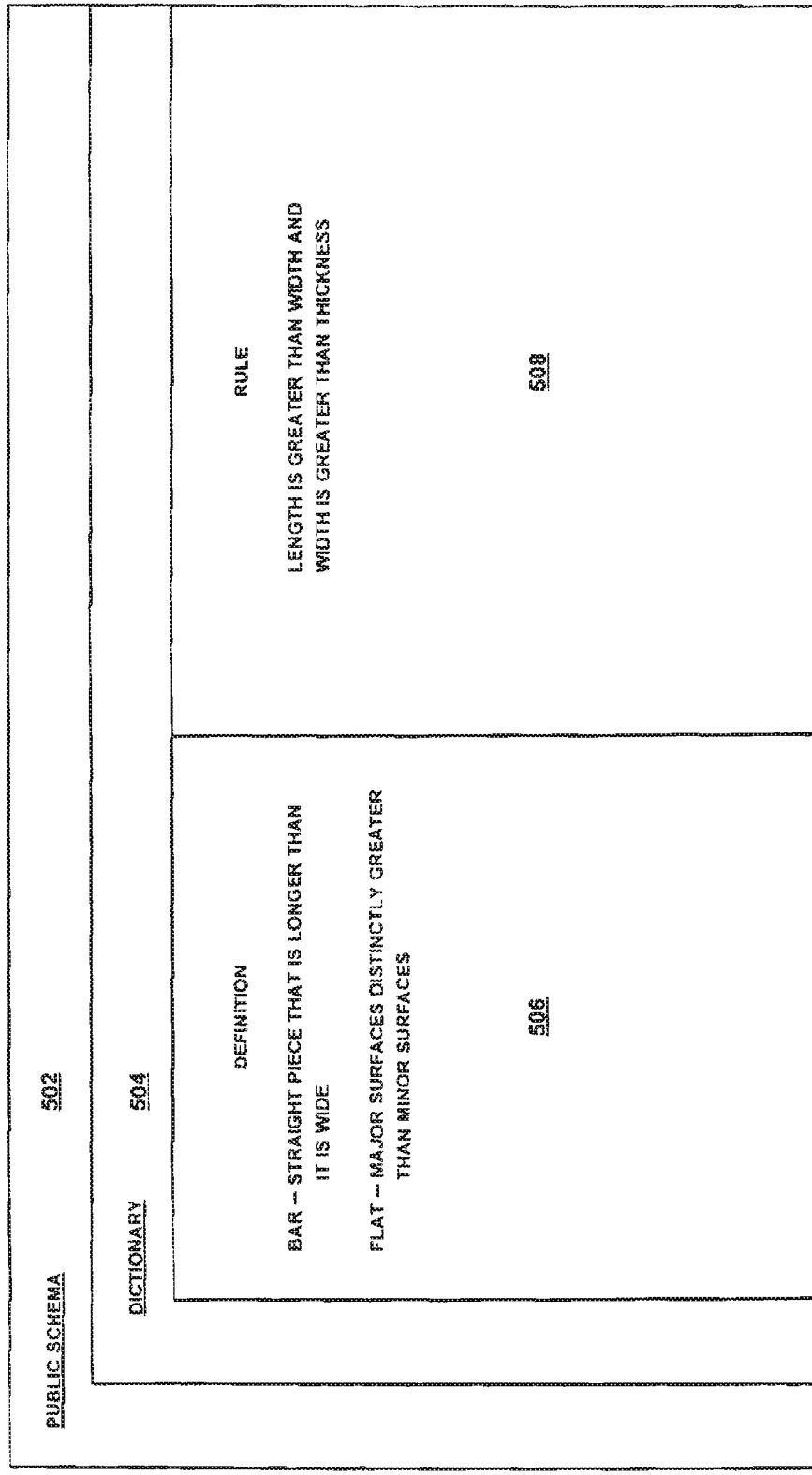
FIGS. 5-6B illustrate exemplary user interfaces in accordance with the present invention.

In the above examples, the conversion system can implement both a frame-slot architecture and a parse tree structure. This architecture and structure will now be described in more detail. Referring first to FIG. 4, a schematic diagram of a conversion system 400 in accordance with the present invention is shown. The illustrated conversion system 400 includes a parser 402 for use in parsing and converting an input stream 403 from a source 404 to provide an output stream 411 in a form for use by a target system 412. In this case, the source stream 403 includes the content "flat bar (1 mm×1"×1')." To accomplish the desired conversion, the parser 402 uses information from a public schema 406, a private schema 408 and a grammar 410. The public schema 406 may include any of various types of information that is generally applicable to the subject matter and is not specific to any entity or group of entities. In this regard, FIG. 5 illustrates an example structure 500 showing how public information related to the subject matter area may be used to define a conversion rule. As shown, a new structure 500 includes a dictionary 504 that forms a portion of the public schema 502. Panel 506 shows definitions related to the object "flat bar." Specifically, "bar" is defined as "straight piece that is longer than it is wide" and "flat" is defined as including "major surfaces distinctly greater than minor surfaces." Such definitions may be obtained from, for example, a general purpose dictionary, a dictionary specific to the subject matter, a subject matter expert or any other suitable source. These definitions are translated to define a rule as shown in panel 508. Specifically, the associated rule indicates that "length is greater than width and width is greater than thickness." This rule may then be written into the logic of a machine-based conversion tool. Referring again to FIG. 4, this rule is reflected in file 407 of public schema 406.

Figure 6A:
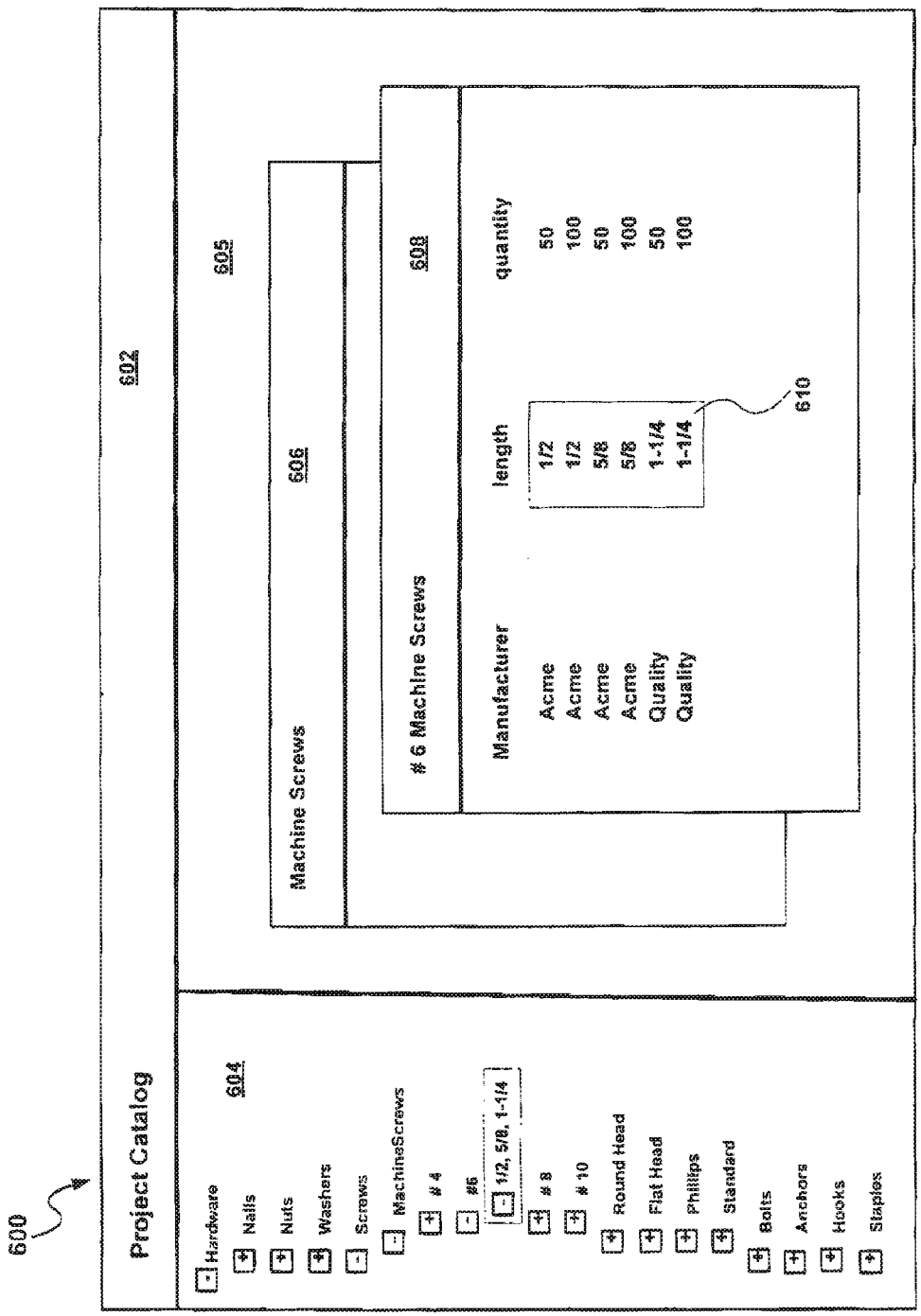

The parser 402 also receives input information from private schema 408 in the illustrated example. The private schema 408 may include conversion rules that are specific to an entity or group of entities less than the public as a whole. For example, the private schema 408 may define legal values for a given attribute based on a catalog or inventory of an interested entity such as an entity associated with the target system 412. An associated user interface 600 is shown in FIG. 6A. For example, the user interface 600 may be used in a start-up mode to populate the legal values for a given attribute. In this case, the user interface is associated with a particular project 602 such as assembling an electronic catalog. The illustrated user interface 600 includes a data structure panel 604, in this case reflecting a parse-tree structure and a frame-slot structure. The interface 600 further includes a private schema panel 605. In this case, the private schema panel 605 includes a number of windows 606 and 608 that define a product inventory of a target company. In this case, a length field 610 associated with a table for #6 machine screws is used to define legal attribute value 612 at a node of panel 604 corresponding to attribute values for #6 machine screws. Associated legal value information is shown as a file 409 of the private schema 408 in FIG. 4.

Figure 6B:
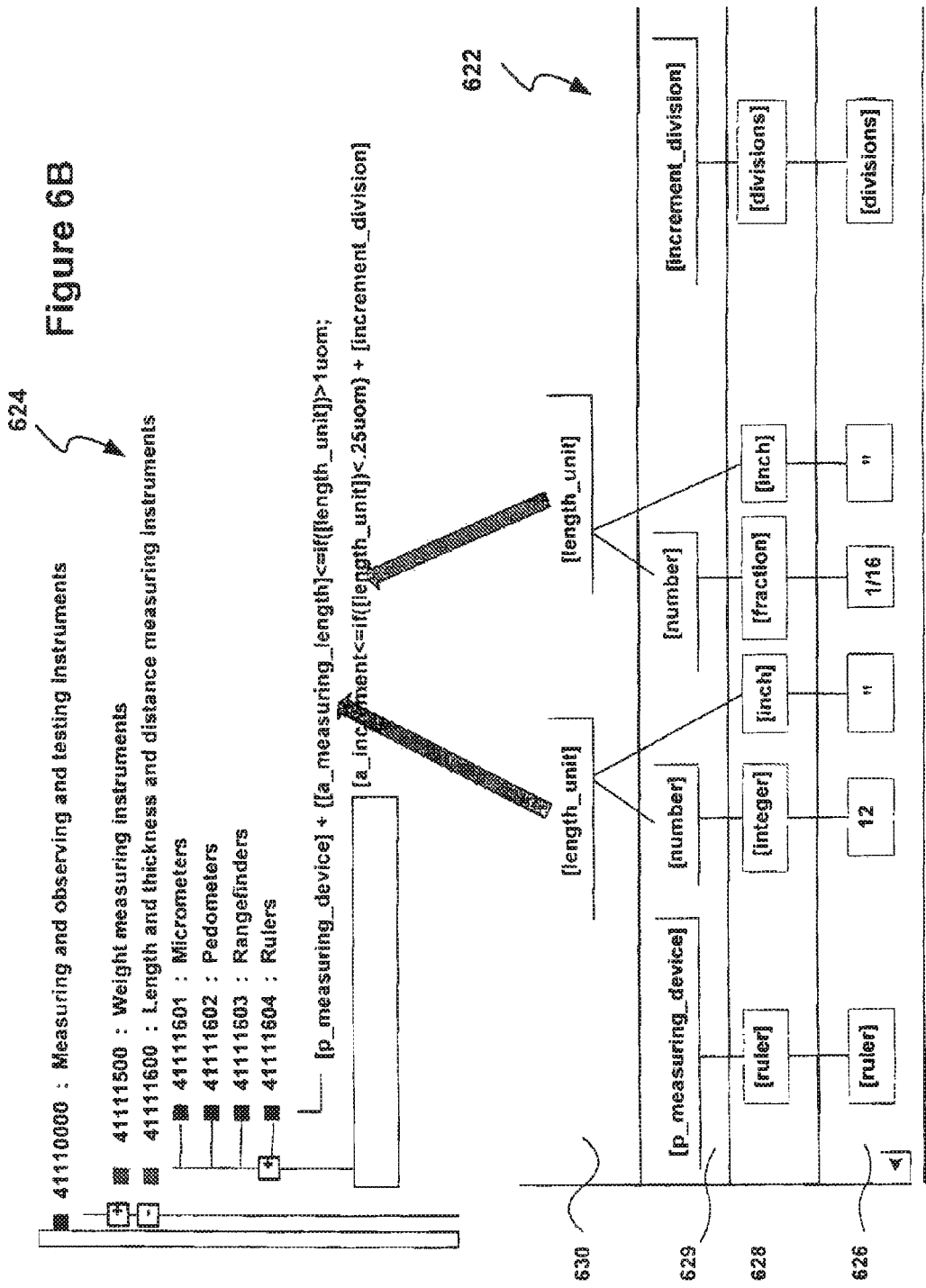

A further example of user interface segments 620 is shown in FIG. 6B. Specifically, FIG. 6B shows a parse tree graphics panel 622 and a parse tree node map panel 624. For purposes of illustration, these panes 622 and 624 are shown in a stacked arrangement. However, it should be appreciated that the panels 622 and 624 may be otherwise arranged on a user interface screen or provided on separate screens. Panel 622 shows a parse tree for a particular product descriptor. In this case, the product descriptor is shown at the base level 626 of the parse tree as "ruler 12" 1/16" divisions." Layers 628-630 show patent nodes of the parse tree. Of particular interest, both of the chunks "12"" and "1/16"" are associated with the high level node "[length_unit]" reflecting the recognition by a parse tool that each of these chunks indicates a measure of length.

If the parse tree structure went no deeper, and there was not frame-slot logic available, these two length measures would present an ambiguity. However, human reader would readily recognize that, in the context of rulers, "12"" likely represents the overall length of the ruler and "1/16"" most likely represents measurement increments. In the case of a frame-slot architecture, such logic can be captured by a rule that enables the parse tool to recognize and apply such context cues to provide accurate interpretations without deep parses.

In this case, such a rule is reflected within the parse tree node map of panel 624. Specifically, a rule for interpreting "length unit" designations in the context of rulers (and, perhaps, other length measuring devices) is encoded under the "ruler" node. As shown, the rule interprets a given "length unit" as indicating "a measuring length" if the associated attribute value is greater than 1 unit of measure (uom) and treats the "length unit" as indicating an "increment" if the associated attribute value is less than 0.25 uom. This provides a certain and structurally efficient mechanism for disambiguating and converting length units in this context. Moreover, it is anticipated that such rules will be reusable in other contexts within a project (e.g., for tape measures or straight edges) and in other projects.

Grammar 410 also provides information to the parser 402. The grammar may provide any of various information defining a lexicon, syntax and an ontology for the conversion process. In this regard, the grammar may involve definition of standardized terminology described in U.S. patent application Ser. No. 10/970,372. Thus, in the illustrated example, file 413 associates the standardized terms "inch," "foot," and "millimeter" with various alternate forms thereof.

The parser 402 can then use the input from the public schema 406, private schema 408 and grammar 410 to interpret the input stream 403 to provide an output stream 411 to the target 412. In this case, the noted input stream 403 is interpreted as "flat bar-1' long, 1" wide and 2 mm thick.

Figure 3:
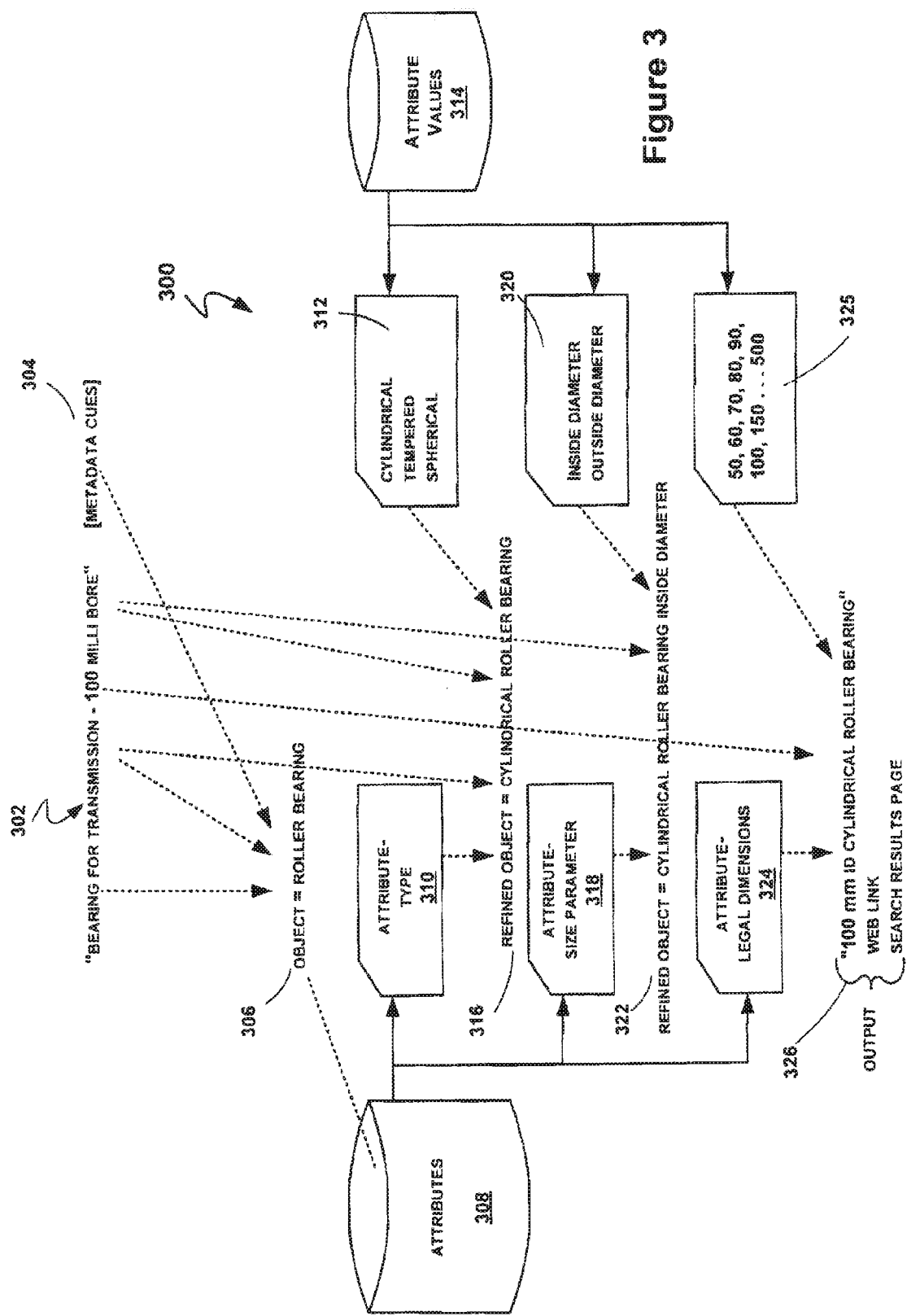
FIG. 3 is a schematic diagram showing an example of a conversion that may be implemented using the system of FIG. 1.

Referring to FIG. 3, a further example related to a frame-slot architecture 300 is illustrated. The architecture 300 is used to process a source stream 302, in this case, "bearings for transmission-100 milli. bore." For example, this source stream may be a record from a legacy information system or a search query. As discussed above, the processing of this source stream 302 may utilize various contextual cues. As will be discussed in more detail below, such contextual cues may be derived from the content of the source stream 302 itself. However, it is also noted that certain metadata cues 304 may be included in connection with the source stream 302. In this regard, it is noted that legacy information systems such as databases may include a significant amount of structure that can be leveraged in accordance with the present invention. Such structure may be provided in the form of links of relational databases or similar tags or hooks that define data relationships. Such contextual information, which can vary substantially in form, is generally referred to herein as metadata.

The frame-slot architecture 300 is utilized to identify an object 306 from the source stream 302. As noted above, this may involve identifying a term within the stream 302 and comparing the term to a list of recognized objects or otherwise using logic to associate an input term with a recognized object. It will be noted in this regard that some degree of standardization or conversion which may involve the use contextual information may be performed in this regard. Thus, in the illustrated example, the identified object "roller bearing" does not literally correspond to any particular segment of the stream 302. Rather, the object "roller bearing" is recognized from the term "bearing" from the stream 302 together with contextual cues provided by the term "transmission" included within the content of the stream 302 and, perhaps, from metadata cues 304. Other sources including external sources of information regarding bearings may be utilized in this regard by logic for matching the stream 302 to the object 306.

Based on the object 306, information regarding attributes 308 and attribute values 314 may be accessed. As discussed above, such information may be derived from public and private schema. For example, an attribute type 310 may be identified for the object 306 and corresponding legal attribute values 312 may be determined. In this case, one attribute associated with the object "roller bearing" is "type" that has legal values of "cylindrical, tapered and spherical." The stream 302 may be processed using this information to determine a refined object 316. In this case, the refined object is determined to be "cylindrical roller bearing." Again, it will be noted that this refined object 316 is not literally derived from the stream 302 but rather, in the illustrated example, is determined based on certain contextual information and certain conversion processes. Thus, the stream 302 is determined to match the attribute value "cylindrical" based on contextual information related to the terms "transmission" and "bore" included within the content of the source stream 302. Information regarding the attributes 308 and attribute values 314 may again be accessed based on this refined object 316 to obtain further attributes 318 and associated attribute values 320. It should be noted that these attributes and attribute values 318 and 320, though illustrated as being dependent on the attribute 310 and attribute value 312 may alternatively be independent attributes and attribute values associated with the object 306. However, in the illustrated example, the attribute "size parameter" is associated with the legal values "inside diameter" and "outside diameter" based on the refined object "cylindrical roller bearings."

In this case, the attribute 318 and attribute value 320 are used together with certain contextual cues to define a further refined object 322. In this case, the further refined object 322 is defined as "cylindrical roller bearing inside diameter." A selection between the legal value "inside diameter" and "outside diameter" is made based on contextual information provided by the term "bore" included within the content of the stream 302. Based on this further refined object 322, information regarding the attributes 308 and attribute values 314 can be used to identify a further attribute 324 and associated legal values 325. In this case, the attribute 324 is "legal dimensions" and associated legal values 325 are defined as "50, 60, 70, 80, 90, 100, 150 . . . 500." These values are assumed for the purposes of this example to be given in millimeters. In this case, the input stream 302 is processed in view of the attribute 324 and legal values 325 to define an output 326 identified as "100 mm ID cylindrical roller bearings." In this regard, the stream term "100 milli." is found to match the legal value of "100" for the attribute "legal dimensions" in the context of cylindrical roller bearings inside diameter. It will be appreciated that the term "milli." has thus been matched, based on a standardization or conversion process, to the designation "mm." It should be noted in this regard that success in matching the source term "100 milli." to the legal value "100 mm" provides further confidence was correctly and accurately performed.

Various types of outputs reflecting various conversion applications may be provided in this regard. Thus, in the case of converting an input file from a legacy database to an output form of a target information system, the input stream 302 may be rewritten as "100 mm ID cylindrical roller bearing." In the case where the source stream 302 represents a search query, the output may be provided by way of linking the user to an appropriate web page or including associated information in a search results page. It will be appreciated that other types of output may be provided in other conversion environments.

As noted above, the present invention may also implement a parse tree structure for conversion processes. Such conversion processes may relate, for example, to search systems or other information transformation systems as will be described below. Generally, such a search system may be operable in two modes: the set-up mode and the use mode. In the set-up mode, the user, who may be a subject matter expert or layman, performs a number of functions including accessing lists of potential search terms and/or source terms, developing a standardized set or set of terms, establishing a classification structure, associating the standardized terms with the classification structure and selectively transforming (e.g., translating) the terms as necessary.

Figure 7:
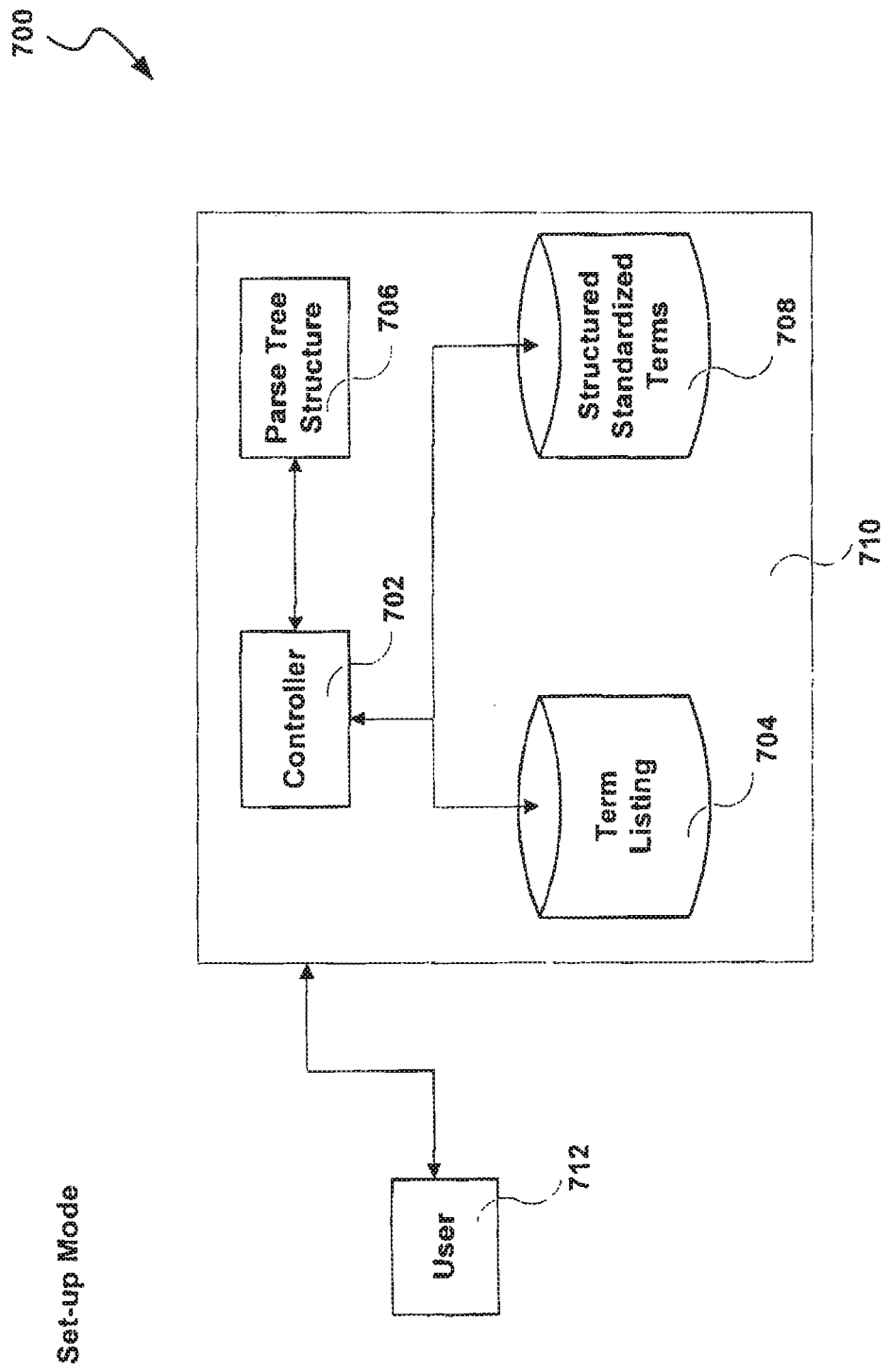
FIG. 7 is a schematic diagram illustrating set-up mode operation of a system in accordance with the present invention.
Figure 8:
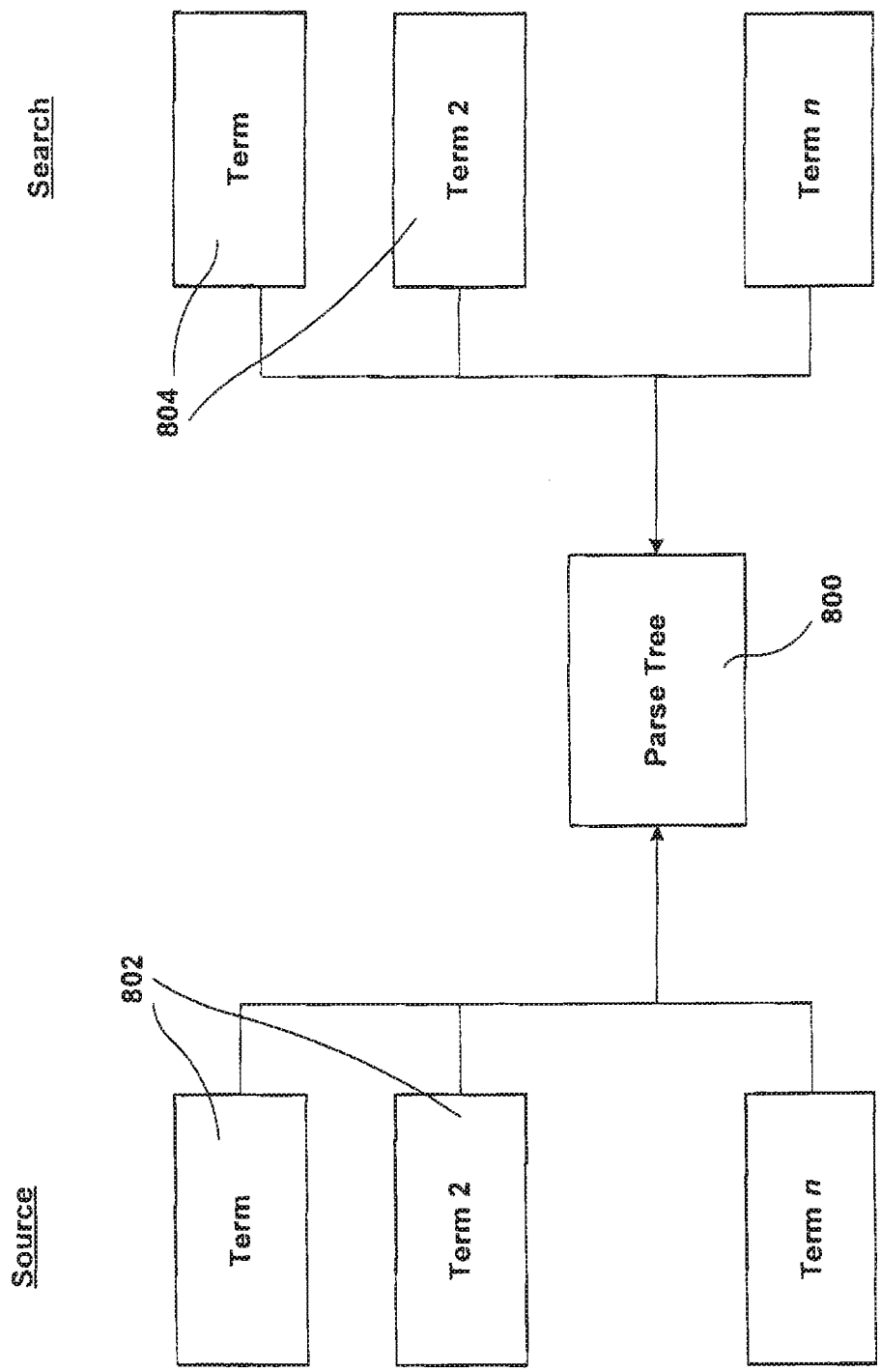
FIG. 8 is a schematic diagram illustrating a search application implemented in accordance with the present invention.

FIG. 7 is a schematic diagram of a search system 700, in accordance with the present invention, operating in the startup mode. Generally, the system 700 includes a controller 702 and storage configured to store a term listing 704, a parse tree structure 706 and a set of structured standardized terms 708. Although the system 3700 is illustrated as being implemented on a single platform 710, it will be appreciated that the functionality of the system 700 may be distributed over multiple platforms, for example, interconnected by a local or wide area network.

The user 712 uses the controller 702 to access a previously developed parse tree structure 706 or to develop the structure 706. In this regard, the parse tree structure 706 generally defines a number of classifications, each generally including one or more sub-classifications that collectively define the subject matter area. Examples will be provided below. The number of layers of classifications and sub-classifications will generally be determined by the user 712 and is dependent on the nature of the subject matter. In many cases, many such classifications will be available, for example, corresponding to headings and subheadings of a catalog or other pre-existing subdivisions of a subject matter of interest. In other cases, the subject matter expert may develop the classifications and sub-classifications based on an analysis of the subject matter.

The user can then use the controller 702 to access a term listing 704 to be processed. As noted above, such a term listing 704 may include potential search terms, source terms from a source data collection or both. In the case of potential search terms, the terms may be obtained from a pre-existing list or may be developed by the user 712. For example, the potential search terms may be drawn from a stored collection of search terms entered by users in the context of the subject matter of interest. Additional sources may be available, in a variety of contexts, for example, lists that have been developed in connection with administering a pay-per-click search engine. The list may be updated over time based on monitoring search requests. Similarly, the source term listing may be previously developed or may be developed by the user 712. For example, in the context of online shopping applications, the source listing may be drawn from an electronic product catalog or other product database.

After accessing the term listing, the user may perform a number of functions including standardization and classification. Standardization refers to mapping of terms from the term listing 704 to a second set, generally a smaller set, of standardized terms. In this manner, misspellings, abbreviations, colloquial terms, synonyms, different linguistic/syntax conventions of multiple legacy systems and other idiosyncratic matter can be addressed such that the list of standardized terms is substantially reduced in relation to the original term listing 704. It will be appreciated from the discussion below that such standardization facilitates execution of the searching functionality as well as transformation functions as may be desired in some contexts, e.g., translation.

The resulting list of standardized terms can then be mapped to the parse tree structure 706. As will be described below, this can be executed via a simple drag and drop operation on a graphical user interface. Thus, an item from a source listing, for example, identifying a particular Post-it note product, may be associated with an appropriate base level classification, for example, "Adhesive Notepad." Similarly, a term from a potential search term listing such as "Sticky Pad" may be associated with the same base level classification. It will be appreciated that a given term may be associated with more than one base level classification, a given base level classification may be associated with more than one parent classification, etc.

As noted above, such a base level classification may be associated with a parent classification, grandparent classification, etc. All of these relationships are inherited when the term under consideration is associated with a base level classification. The result is that the standardized term is associated with a string of classes and sub-classes of the parse tree structure 3706. For example, these relationships may be reflected in an XML tag system or other metadata representation associated with the term. The resulting structured standardized terms are then stored in a storage structure 3708 such as a database.

It will thus be appreciated that, in the illustrated embodiment, both source terms and potential search terms may be mapped to elements of the same parse tree structure. This is shown in FIG. 88. As shown, multiple terms 802 from the source collection are mapped to the parse tree structure 800. Similarly, multiple terms from the potential search term listing 804 are mapped to corresponding elements of the parse tree structure 800. In this manner, a particular search term entered by a user can be used to identify responsive information from the source collection based on a common classification or sub-classification despite the absence of any overlap between the entered search term and the corresponding items from the source collection. It will be appreciated that it may be desirable to link a given term 802 or 804 with more than one classification or classification lineage of the parse tree 800. This may have particular benefits in connection with matching a particular product or product category to multiple potential search strategies, e.g., mapping "pen" to searches including "writing instrument" or "office gift."

Figure 9:
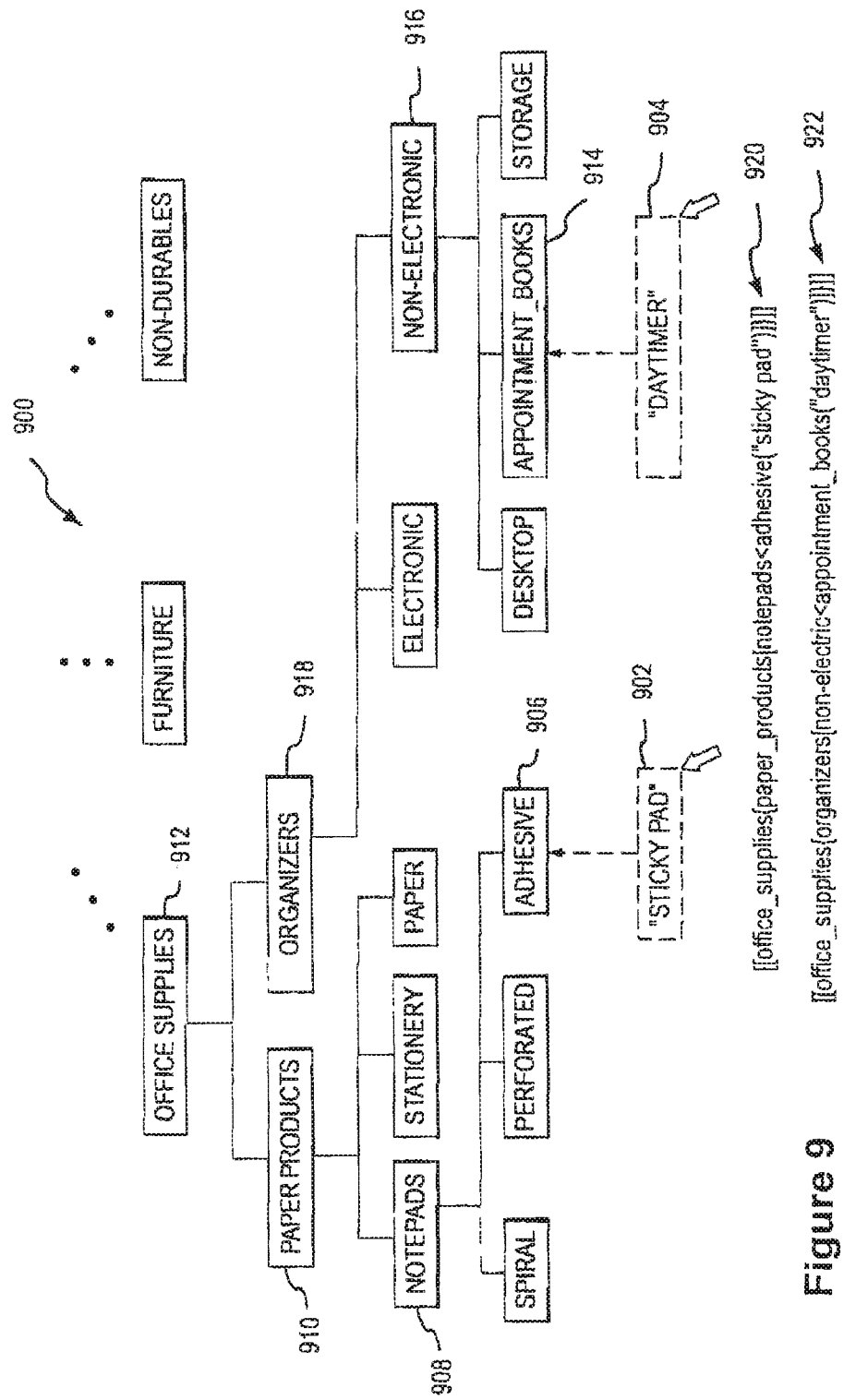
FIGS. 9 and 10 illustrate a classification system in accordance with the present invention.

An example of this process is shown in FIG. 9 with respect to particular search terms. In particular, FIG. 9 shows a user interface representing a portion of a parse tree 900 for a particular subject matter such as the electronic catalog of an office supply warehouse. In this case, the user uses the graphical user interface to establish an association between search terms 902 and 904 and the parse tree 900. Specifically, search term 902, in this case "sticky pad" is dragged and dropped on the node 906 of the parse tree 900 labeled "Adhesive." This node 906 or classification is a sub-classification of "Notepads" 908 which is a sub-classification of "Paper Products" 910 which, finally, is a sub-classification of "Office_Supplies" 912. Similarly, term 904, in this case "Daytimer," is associated with classification "Appointment_Books which is a sub-classification of "Non-electronic" 916 which, in turn, is a sub-classification of "Organizers" 918 which, finally, is a sub-classification of "Office_Supplies" 3912. Data strings 920 and 922 illustrate the resulting structured terms reflecting the classification relationships (other syntax, such as standard XML tag syntax, may be used to reflect the classification structure). It will be appreciated that the example of FIG. 9 omits the optional step of term standardization. That is, the potential search term "Sticky Pad" may alternatively first be mapped to a standardized term such as "Post-it note" before being associated with the parse tree. Such standardization will be described in more detail below.

Figure 10:
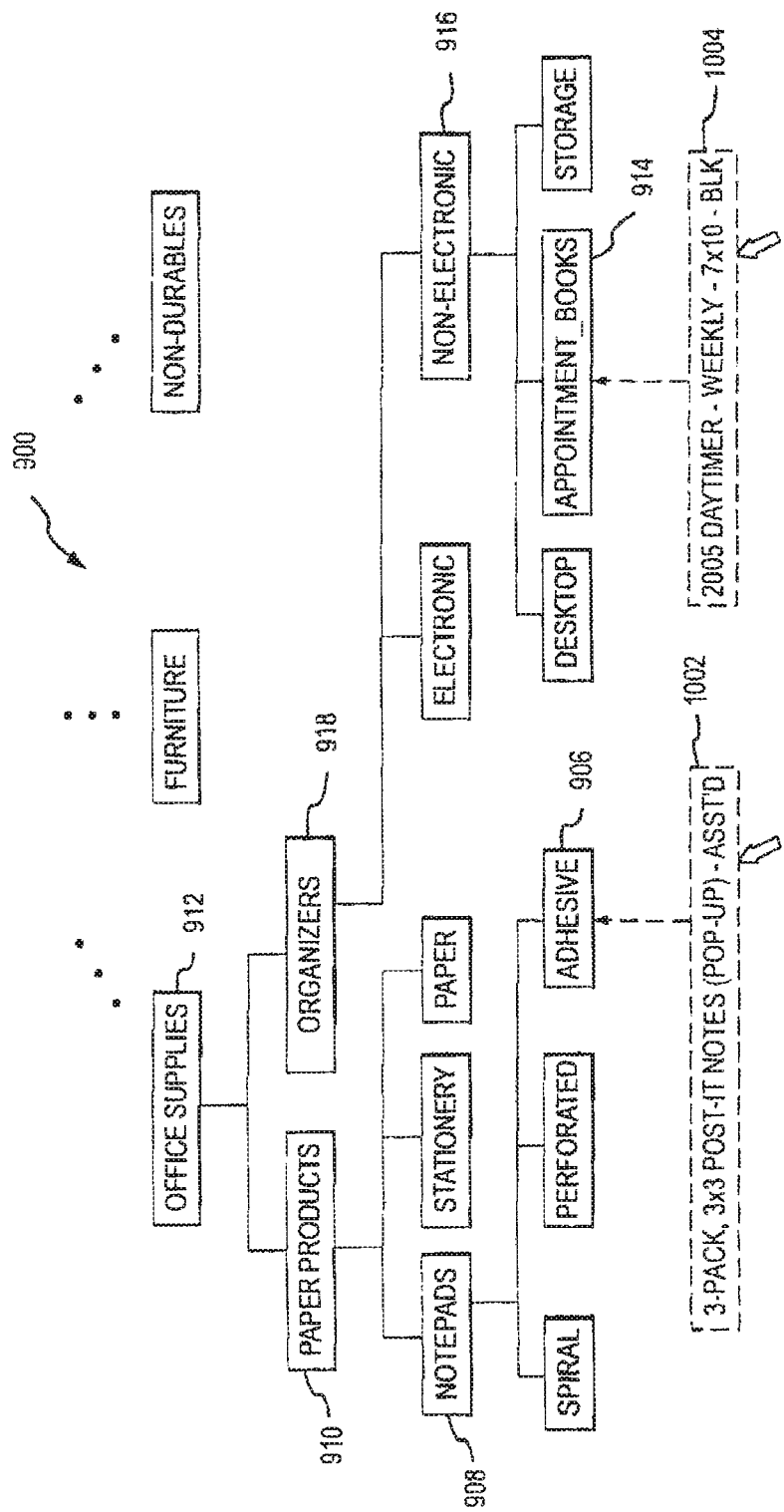

FIG. 10 illustrates how the same parse tree 900 may be used to associate a classification with items from a source collection. For example, such a source collection may be drawn from an electronic catalog or other database of the business. In this case, the source term 1002 denoted "3-pack, 3×3 Post-it notes (Pop-up)-Asst'd" is associated with the same node 906 as "Sticky Pad" was in the previous example. Similarly, term 1004 denoted "2005 Daytimer-Weekly-7×10-Blk" is associated with the same node 914 as potential search term "Daytimer" was in the previous example. As will be appreciated from the discussion below, such common associations with respect to the parse tree 900 facilitate searching.

Figure 11:
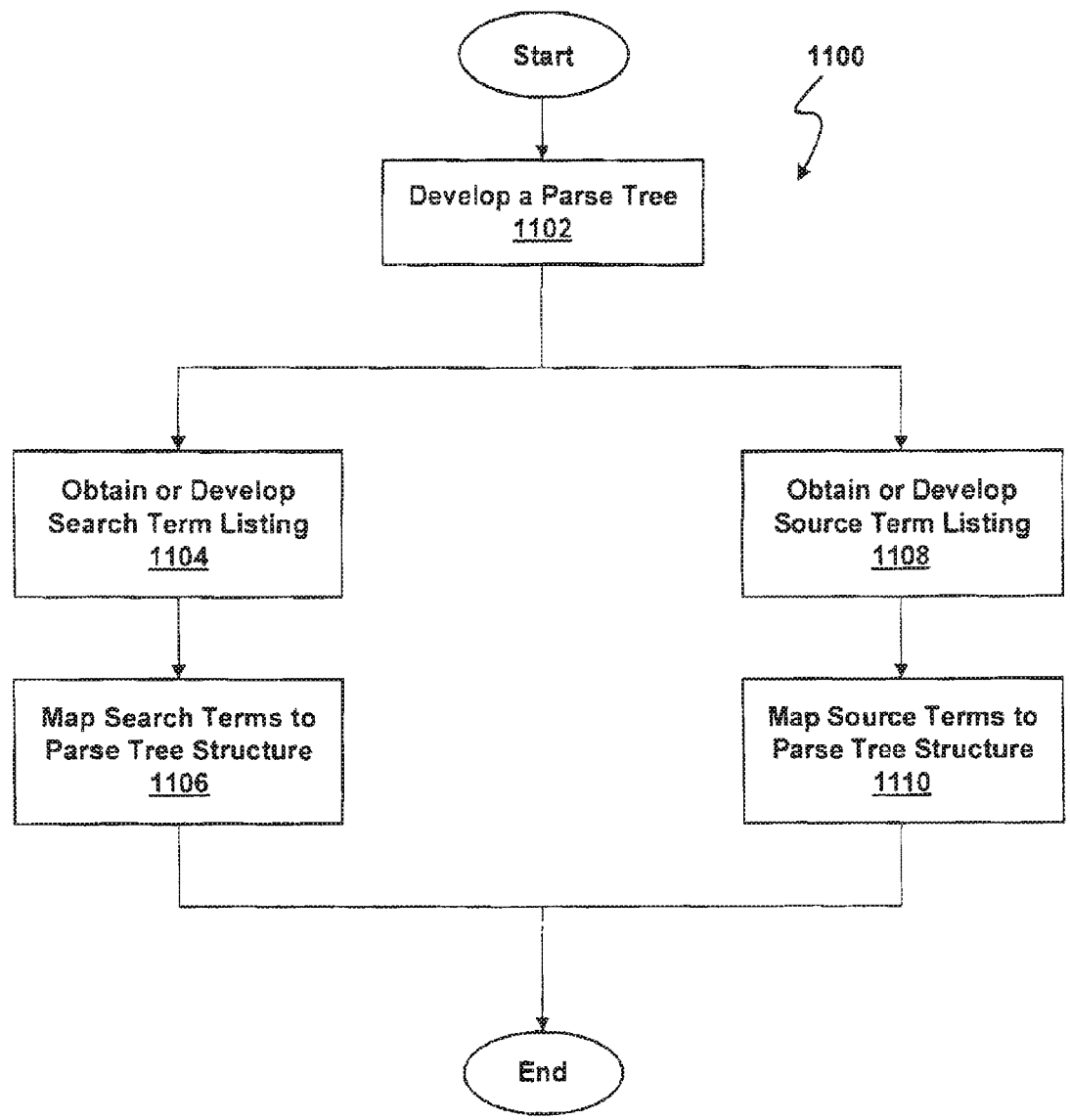
FIG. 11 is a flow chart illustrating a process for establishing a parse tree structure in accordance with the present invention.

This process for establishing a knowledge base may be summarized with respect to the flow chart of FIG. 11. The illustrated process 1100 is initiated by developing (1102) a parse tree that defines the subject matter of interest in terms of a number of classifications and sub-classifications. As noted above, such parsing of the subject matter may be implemented with enough levels to divide the subject matter to the desired granularity. The process 1100 then proceeds on two separate paths relating to establishing classifications for potential search terms and classifications for items from the source collection. It will be appreciated that these two paths may be executed in any order or concurrently. On the potential search term path, the process involves obtaining or developing (1104) a potential search term listing. As noted above, an existing list may be obtained, a new list may be developed by a subject matter expert, or some combination of these processes may occur. The terms are then mapped (1106) to the parse tree structure such as by a drag and drop operation on a graphical user interface as illustrated above. On the source term process line, the process 1100 proceeds by obtaining or developing (1108) a source term listing. Again, the source term listing may be obtained from existing sources, developed by subject matter expert or some combination of these processes may occur. The individual terms are then mapped (1110) to the parse tree structure, again, for example, by way of a drag and drop operation as illustrated above. Although not shown, the process 1100 may further include the steps of re-writing the potential search terms and source terms in a standardized form.

Figure 12:
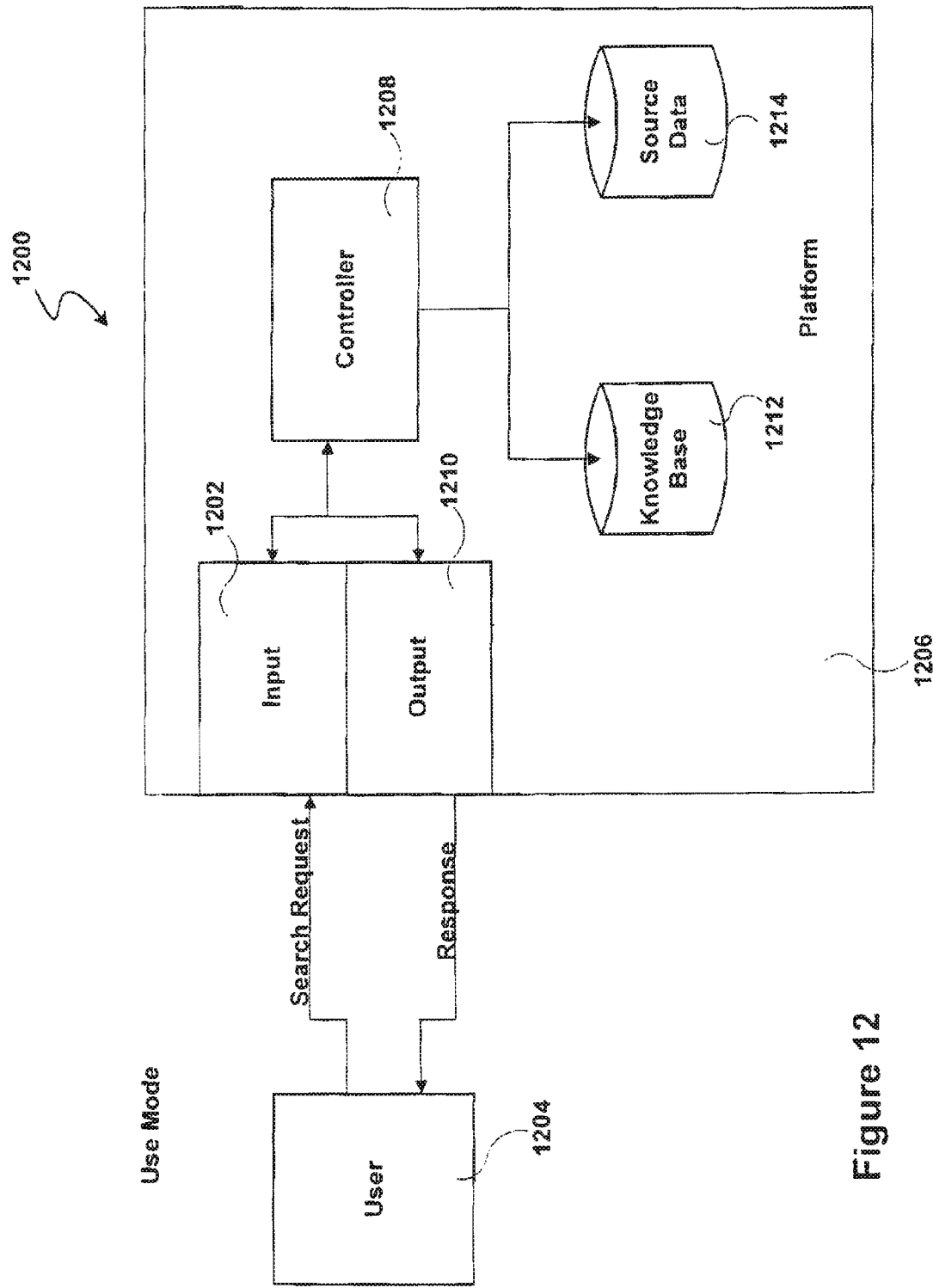
FIG. 12 is a schematic diagram illustrating a system for implementing a search application in accordance with the present invention.

The search system of the present invention is also operative in a use mode. This is illustrated in FIG. 12. The illustrated system 1200 includes input structure 1202 for receiving a search request from a user 1204. Depending on the specific network context in which the system 1200 is implemented, the search request may be entered directly at the machine executing the search system, or may be entered at a remote node interconnected to the platform 1206 via a local or wide area network. The nature of the input structure 1202 may vary accordingly. The search request is processed by a controller 1208 to obtain responsive information that is transmitted to the user 1204 via output structure 1210. Again, the nature of the output structure 1210 may vary depending on the specific network implementation.

In the illustrated implementation, in order to obtain the responsive information, the controller accesses the knowledge base 1212. The knowledge base 1212 includes stored information sufficient to identify a term from the search request, rewrite the term in a standardized form, transform the term if necessary, and obtain the metadata associated with the term that reflects the classification relationships of the term. The controller then uses the standardized term together with the classification information to access responsive information from the source data 1214.

Figure 13:
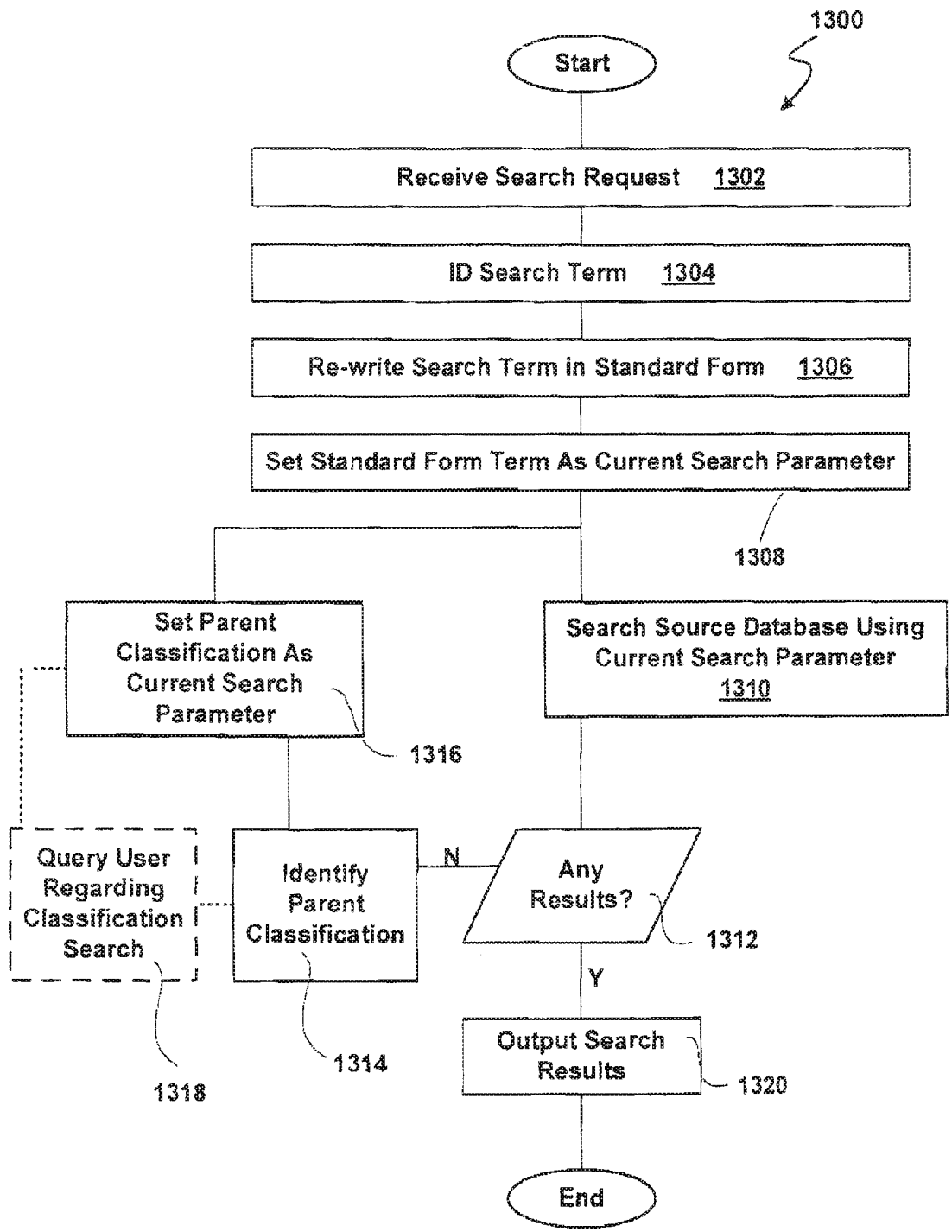
FIG. 13 is a flow chart illustrating a process that may be implemented by the system of FIG. 12.
Figure 14:
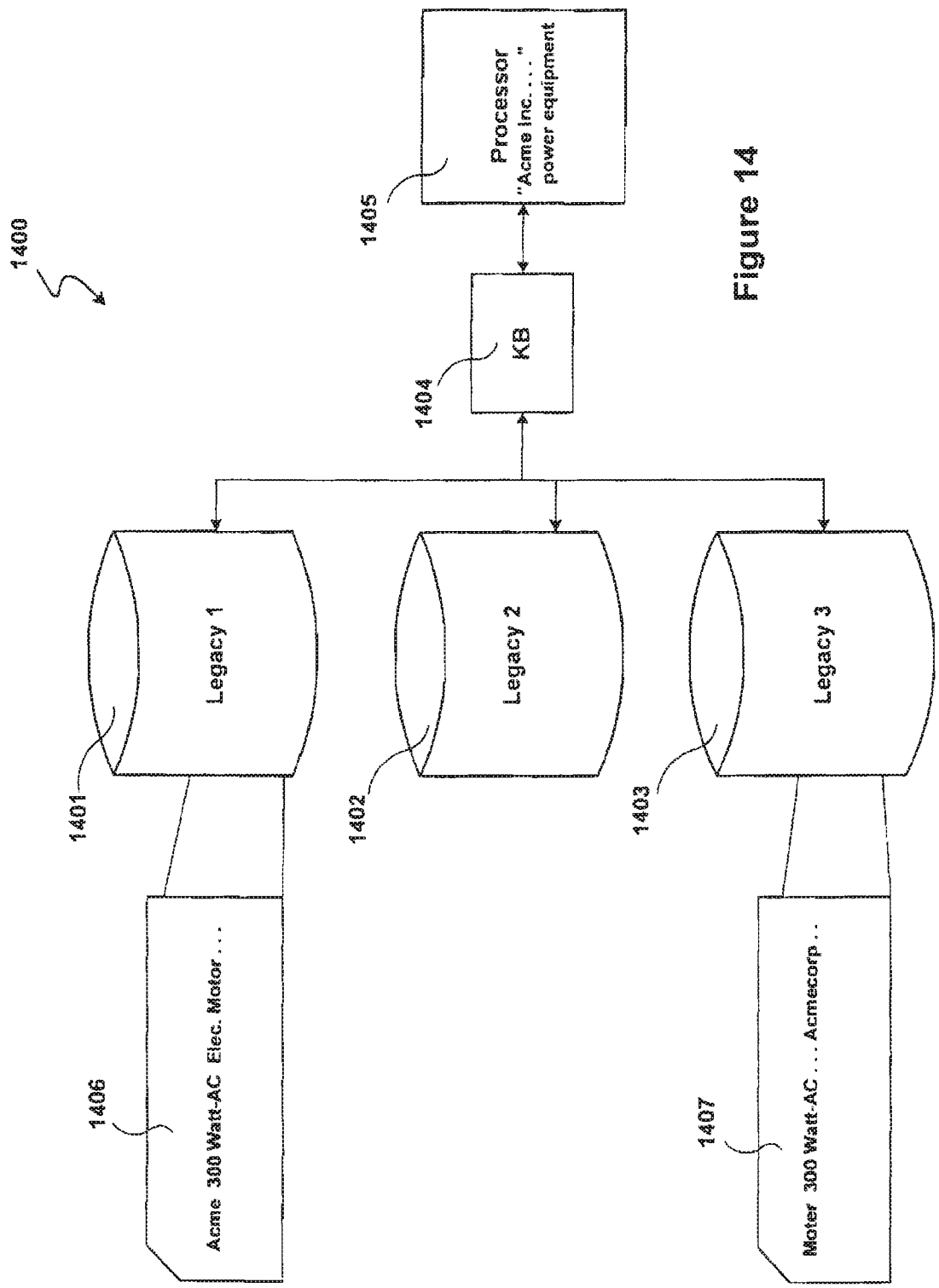
FIG. 14 is a schematic diagram illustrating a system using a knowledge base to process legacy information in accordance with the present invention.

FIG. 13 is a flow chart illustrating a corresponding process 14300. The process 100 is initiated by receiving (1302) a search request, for example, from a keyboard, graphical user interface or network port. The system is then operative to identify (1304) a search term from the search request. In this regard, any appropriate search query syntax may be supported. For example, a search term may be entered via a template including predefined Boolean operators or may be entered freeform. Existing technologies allow for identification of search terms thus entered.

The search term is then rewritten (1306) in standard form. This may involve correcting misspellings, mapping multiple synonyms to a selected standard term, implementing a predetermined syntax and grammar, etc., as will be described in more detail below. The resulting standard form term is then set (1308) as the current search parameter.

In the illustrated implementation, the search then proceeds iteratively through the hierarchy of the parse tree structure. Specifically, this is initiated by searching (1310) the source database using the current search parameter. If any results are obtained (1312) these results may be output (1320) to the user. If no results are obtained, the parent classification at the next level of the parse tree is identified (1314). That parent classification is then set (1316) as the current search parameter and the process is repeated. Optionally, the user may be queried (1318) regarding such a classification search. For example, the user may be prompted to answer a question such as "no match found—would you like to search for other products in the same classification?" In addition, the logic executed by the process controller may limit such searches to certain levels of the parse tree structure, e.g., no more than three parse levels (parent, grandparent, great grandparent) in order to avoid returning undesired results. Alternatively or additionally, such searching may be limited to a particular number of responsive items. The responsive items as presented to the user may be ordered or otherwise prioritized based on relevancy as determined in relation to proximity to the search term in the parse tree structure.

It will be appreciated that searching functionalities such as discussed above is not limited to searching of a web site or electronic catalog by outside parties but is more generally useful in a variety of searching and database merging environments. FIG. 44 illustrates a system 1400 for using a knowledge base 1404 to access information from multiple legacy databases 1401-1403. Many organizations have related information stored in a variety of legacy databases, for example, product databases and accounting databases. Those legacy databases may have been developed or populated by different individuals or otherwise include different conventions relating to linguistics and syntax.

In the illustrated example, a first record 1406 of a first legacy database 1401 reflects a particular convention for identifying a manufacturer ("Acme") and product ("300 W AC Elec.Motor . . ."). Record 1407 associated with another legacy database 1403 reflects a different convention including, among other things, a different identification of the manufacturer ("AcmeCorp") and a misspelling ("Moter").

In this case, an internal or external user can use the processor 1405 to enter a substantially freeform search request, in this case "Acme Inc. Power Equipment." For example, such a search request may be entered in the hopes of retrieving all relevant information from all of the legacy databases 1401-1403. This is accommodated, in the illustrated embodiment, by processing the search request using the knowledge base 1404. The knowledge base 1404 executes functionality as discussed above and in more detail below relating to standardizing terms, associating terms with a classification structure and the like. Thus, the knowledge base 1404 may first process the search query to standardize and/or classify the search terms. For example, Acme, Inc. may be associated with the standardized term "Acme." The term polar equipment may be associated with the standardized term or classification "motor." Each of these terms/classifications may in turn be associated with associated legacy forms of the databases 1401-1403 to retrieve responsive information from each of the databases. Additional conventional functionality such as merge functionality may be implemented to identify and prioritize the responsive information provided as search results to the processor 1405. In this manner, searching or merging of legacy data systems is accommodated with minimal additional code.

From the discussion above, it will be appreciated that substantial effort is involved in transforming data from one form to another, e.g., from a raw list of potential search or source terms to a set or sets of standardized, classified and, perhaps, translated terms. The present invention also accommodates sharing information established in developing a transformation model such as a semantic metadata model (SMM) used in this regard. Such sharing of information allows multiple users to be involved in creating the knowledge base, e.g., at the same time, and allows components of such information to be utilized in starting new knowledge base creation projects. This functionality is described in detail in U.S. patent application Ser. No. 10/970,372 which is incorporated herein by reference in its entirety.

While various embodiments of the present invention have been described in detail, it is apparent that further modifications and adaptations of the invention will occur to those skilled in the art. However, it is to be expressly understood that such modifications and adaptations are within the spirit and scope of the present invention.

What is claimed:

1. A method for use in operating a machine-based tool for converting data from a first form to a second form, comprising the steps of:

establishing, based on external knowledge of a subject matter area independent of analysis of a particular data set to be converted, a number of schema, each including one or more conversion rules for use in converting data within a corresponding context of said subject matter area;

identifying a set of data to be converted from said first form to said second form;

accessing at least a first schema of said number of schema;

obtaining at least one contextual cue corresponding to a particular context regarding said set of data from a source external to said set of data, wherein said particular context corresponds to said subject matter area of said first schema; and using an included conversion rule of said first schema in a process for converting said set of data from said first form to said second form.

2. A method as set forth in claim 1, wherein said step of establishing comprises identifying a public schema, including conversion rules generally applicable to said subject matter area independent of any entity or group of entities associated with said set of data, that establishes a structure for understanding at least a portion of the subject matter area.

3. A method as set forth in claim 2, wherein said public schema involves an accepted public definition of a semantic object.

4. A method as set forth in claim 1, wherein said step of establishing comprise identifying a private schema, including conversion rules specific to an entity or group of entities less than the public as a whole, that establishes a structure for understanding at least a portion of the subject matter area.

5. A method as set forth in claim 1, wherein said step of identifying comprises parsing a data stream to obtain an attribute phrase including information potentially defining a semantic object, an attribute of said object and an attribute value of said attribute.

6. A method as set forth in claim 5, wherein said step of obtaining comprises associating said semantic object with said particular context.

7. A method as set forth in claim 5, wherein said step of using comprises executing logic to interpret said information so as to identify said object, attribute or attribute value.

8. A method as set forth in claim 5, wherein said step of using comprises performing a comparison of said object, attribute or attribute value to a corresponding set of objects, attributes, or attribute values defined by said first schema.

9. A method as set forth in claim 8, wherein said step of using comprises using said comparison to convert said set of data from said first form to said second form.

10. A method as set forth in claim 8, wherein said step of using comprises using said comparison to identify an anomaly regarding said set of data.

11. A method as set forth in claim 5, wherein said step of using comprises identifying legal attribute values for said attribute.

12. A method as set forth in claim 1, wherein said step of establishing is implemented in a start-up mode for configuration of logic of said machine-based tool so as to convert data based on contextual cues inferred from an understanding of said subject matter area.

13. A method as set forth in claim 12, wherein said first schema is operative to enable proper conversion of a set of data which was not specifically addressed in said configuration.

14. A method as set forth in claim 1, wherein said source external from said set of data comprises said first schema.

15. A method as set forth in claim 14, wherein said obtaining comprises matching said first schema with said set of data such that said subject matter area of said first schema corresponds with said particular context.

16. A machine-based method for use in a conversion of data from a first form associated with a data source to a second form for use by a target data system, comprising the steps of:
receiving content associated with said data source;
obtaining first information for use in said conversion, wherein said first information is determined at least in part based on a location external to said content;
first using said first information to obtain second information from said location external to said content, for use in said conversion; and
second using said first information and said second information in said conversion of said content from said first form to said second form.

17. A method as set forth in claim 16, wherein said content is structured data and said step of receiving comprises accessing structured data storage.

18. A method as set forth in claim 16, wherein said content is unstructured.

19. A method as set forth in claim 16, wherein said step of obtaining comprises analyzing said content to determine a subject matter context of said content at least partially based on a comparison of said content to said location external to said content.

20. A method as set forth in claim 16, wherein said content comprises payload data including a meaning of said content and metadata describing said data, and said step of obtaining comprises using said metadata to derive said first information.

21. A method as set forth in claim 16, wherein said first information identifies a subject matter context of said content and said step of first using comprises accessing conversion rules specific to said subject matter context.

22. A method as set forth in claim 21, wherein said content includes an attribute or value susceptible of at least two possible meanings and said conversion rules are operative to select one of said at least two meanings based on said subject matter context.

23. A method as set forth in claim 21, wherein said rules are operative for identifying an impermissible attribute or attribute value based on said subject matter context.

24. A method as set forth in claim 16, wherein:
said first information comprises ambiguous data that is ambiguous in that it is susceptible, when considered in isolation, of at least two different conversions, and said first information further identifies a subject matter context of said ambiguous data;
said second information includes a rule for disambiguating said ambiguous data based on said subject matter context; and
said step of second using comprises applying said rule to said ambiguous data to select one of said at least two different conversions.

25. A method as set forth in claim 16, wherein said step of second using is executed by a machine having access to a first semantic metadata model including a classification structure for a subject matter under consideration and associated conversion rules, and a number of sets of frame rules, separate from said semantic metadata model, for use in disambiguating terms based on specific subject matter contexts within said subject matter under consideration, and said step of second using comprises selecting one of said sets of frame rules.

26. A method as set forth in 16, wherein said location external to said content corresponds to a public schema, including conversion rules generally applicable to a subject matter area independent of any entity or group of entities associated with said content, that establishes a structure for understanding at least a portion of the subject matter area.

27. A method as set forth in claim 26, wherein said public schema involves an accepted public definition of a semantic object.

28. A method as set forth in claim 16, wherein said location external to said content corresponds to a private schema, including conversion rules specific to an entity or group of entities less than the public as a whole, that establishes a structure for understanding at least a portion of a subject matter area.

* * * * *